United States Patent
Liu

(10) Patent No.: US 10,377,202 B2
(45) Date of Patent: Aug. 13, 2019

(54) SUSPENSION DEVICE FOR VEHICLE

(71) Applicant: TOYOTA JIDOSHA KABUSHIKI KAISHA, Toyota-shi, Aichi (JP)

(72) Inventor: Yanqing Liu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

(21) Appl. No.: 15/820,905

(22) Filed: Nov. 22, 2017

(65) Prior Publication Data

US 2018/0141400 A1    May 24, 2018

(30) Foreign Application Priority Data

Nov. 22, 2016    (JP) ................... 2016-226668

(51) Int. Cl.
*B60G 15/06*    (2006.01)
*B60G 17/033*    (2006.01)

(52) U.S. Cl.
CPC ......... *B60G 17/033* (2013.01); *B60G 15/068* (2013.01); *B60G 2400/252* (2013.01); *B60G 2400/62* (2013.01)

(58) Field of Classification Search
CPC .............. B60G 17/033; B60G 15/068; B60G 2400/252; B60G 2400/62
See application file for complete search history.

(56) References Cited

U.S. PATENT DOCUMENTS

| | | | | |
|---|---|---|---|---|
| 5,322,319 A | * | 6/1994 | Tanaka | B60G 17/0165 280/5.503 |
| 9,855,811 B2 | * | 1/2018 | Murakami | F16F 9/48 |
| 2011/0025000 A1 | * | 2/2011 | Inoue | B60G 17/0157 280/5.507 |
| 2019/0105958 A1 | * | 4/2019 | Mochizuki | B60G 15/062 |

FOREIGN PATENT DOCUMENTS

| | | | |
|---|---|---|---|
| EP | 1023861 A1 | 8/2000 | |
| JP | S50-021186 A | 3/1975 | |
| JP | S59-079641 U | 5/1984 | |
| JP | S60-189405 U | 12/1985 | |
| JP | H09-123819 A | 5/1997 | |
| JP | 2000103214 A * | 4/2000 | ......... H04L 12/5601 |
| JP | 2000-217658 A | 8/2000 | |
| JP | 2013-116641 A | 6/2013 | |
| JP | 2017039409 A * | 2/2017 | |

OTHER PUBLICATIONS

Jun. 4, 2019, Office Action issued in Japanese Patent Application No. 2016-226668.

* cited by examiner

*Primary Examiner* — Drew J Brown
(74) *Attorney, Agent, or Firm* — Oliff PLC

(57) ABSTRACT

A suspension device for a vehicle includes a spring device disposed between a sprung member and an unsprung member of a vehicle and allowing a relative displacement between the sprung member and the unsprung member. The spring constant $k2c$ of the spring device when the spring device is deformed in the direction in which the spring device contracts with respect to the predetermined reference length is configured to be smaller than the spring constant $k2e$ of the spring device when the spring device is deformed in the direction in which the spring device expands with respect to the predetermined reference length. Consequently, it is possible to obtain a characteristic opposite to the spring characteristic of the seat, and as a result, ride quality can be improved.

3 Claims, 15 Drawing Sheets

SUSPENSION DEVICE FOR VEHICLE

BACKGROUND OF THE INVENTION

1. Field of the Invention

The present invention relates to a suspension device for a vehicle which includes a seat whose seat surface is nonlinearly displaced with respect to a load input to the seat surface, the seat surface being an upper surface of a seating portion (seat) on which an occupant of the vehicle sits.

2. Description of the Related Art

A suspension device is conventionally known, in which a stroke amount (Y) varies linearly with respect to an input load (X) (i.e., $Y=k \cdot X$, where k is a constant,). That is, the "characteristic of input load to stroke" of the conventional suspension device (hereinafter referred to as the "conventional device") in a case where an actual stroke amount is smaller than a "stroke amount with respect to a predetermined input load" is the same as one in a case where the actual stroke amount is larger than the "stroke amount with respect to the predetermined input load" (for example, refer to Japanese Patent Application Laid-open (kokai) No. 2013-116641).

SUMMARY OF THE INVENTION

A displacement amount (hereinafter also referred to as a "deflection amount") of a seating surface (an upper surface of a seating portion) of a seat of a vehicle becomes larger as a load applied to the seating surface (hereinafter referred to as a "seat load") becomes larger. More specifically, as indicated by a curve C1 in FIG. 14, the seat adopted in a vehicle generally has a characteristic/property that "a ratio (a value corresponding to an inclination of the curve C1) of a change amount in the deflection amount of the seating surface to a unit change amount of the seat load" becomes smaller as the seat load becomes larger.

For example, in the example shown in FIG. 14, a magnitude dp of the change amount in the deflection amount of the seating surface when the seat load increases from a basic load 5A by a unit load A is smaller than a magnitude dm of the change amount in the deflection amount of the seating surface when the seat load decreases from the basic load 5A by the unit load A (dp<dm). In other words, the seat can be regarded as a type of spring device having a "spring constant" which becomes larger as the deflection amount becomes larger.

Meanwhile, an occupant feels vibration through the seating surface. Tires, the suspension device, and the seat are interposed between a road surface and the seating surface. Thus, regarding a ride quality of the vehicle, it is necessary to consider not only the characteristics of the tires and the suspension device of the vehicle but also the characteristics of the seat. However, the conventional device has not been designed, taking into consideration of the characteristic of the seat.

The present invention has been made to cope with the above-mentioned problem. Specifically, one of objects of the present invention is to provide a suspension device for a vehicle, which is capable of further improving a ride quality of the vehicle by taking into consideration of the characteristic of the seat.

A suspension device for a vehicle of the present invention (hereinafter, also referred to as a "present invention device") is applied to a vehicle (100) having a seat (42). A displacement amount of a seating surface of the seat with respect to an unit change amount of a seat load which is a load input to the seating surface of the seat decreases as the seat load increases. The present invention device comprises a spring device (30, 300) which is interposed between a sprung member (40) and an unsprung member (50) of the vehicle. The spring device elastically supports the sprung member with respect to the unsprung member.

To describe the present invention device, a reference stroke amount is defined as a stroke amount of the spring device when an occupant sits on the seat, and the stroke amount is defined to increase in a positive direction as the spring device is displaced more greatly in a direction of contraction.

According to the definitions above, the spring device has characteristics/features that satisfies conditions A and B described below.

[Condition A] A spring constant ($k2c$) when the stroke amount is larger than the reference stroke amount is less than or equal to the spring constant ($k2e$) when the stroke amount is smaller than the reference stroke amount (that is, $k2c \leq k2e$), and

[Condition B] A spring constant of the spring device when the stroke amount is larger than or equal to a stroke amount which is larger than the reference stroke amount by a positive predetermined amount ($\alpha$) is smaller than a spring constant of the spring device when the stroke amount is less than or equal to a stroke amount which is smaller than the reference stroke amount by the positive predetermined amount ($\alpha$).

Hereinafter, an operation of the present invention device will be described using an example of present invention device. The horizontal axis of the graphs shown in FIGS. 15A to 15C indicates the stroke amount zs of the spring device. The vertical axis indicates the spring force Fss of the spring device. In each of these graphs, a "relationship between the stroke amount and the spring force" of the example of the present invention device is shown. The inclinations of "straight lines S1 and S2" showing this relationship represent the spring constant of the spring device.

As shown in FIG. 15A, according to the spring device of this example, when a weight of an occupant is normal weight, the reference stroke amount is a stroke amount $zs0$. The spring constant of this spring device changes depending on whether or not the stroke amount zs is larger than the reference stroke amount $zs0$. More specifically, when the stroke amount zs is larger than the reference stroke amount $zs0$ (when the spring device is displaced in a contraction-side), as indicated by the straight line S1, the spring constant is a "relatively small value $k2c$". When the stroke amount zs is smaller than the reference stroke amount $zs0$ (when the spring device is displaced in an expansion-side), as indicated by the straight line S2, the spring constant is a "relatively large value $k2e$". This spring device satisfies the above mentioned [condition A] since the value $k2c$ is smaller than the value $k2e$ (that is, $k2c < k2e$).

Further, as understood from FIG. 15A, the spring constant when the stroke amount zs is larger than or equal to a stroke amount ($zs0+\alpha$) which is larger than the reference stroke amount $zs0$ by a positive predetermined amount ($\alpha$) is the value $k2c$ (referred to a region R11). The spring constant when the stroke amount zs is less than or equal to a stroke amount ($zs0-\alpha$) which is smaller than the reference stroke amount $zs0$ by the positive predetermined amount ($\alpha$) is the value k2*e* (referred to a region R12). Thus, this spring device satisfies the above-mentioned [condition B].

FIG. 15B shows the "relationship between the stroke amount and the spring force" when the weight of the occupant is lighter than the normal weight. In this case, the reference stroke amount is a stroke amount zs1 smaller than the stroke amount zs0. It is clear from this figure that, when the stroke amount zs is larger than the reference stroke amount zs1 (when the spring device is displaced in the contraction-side), the spring constant is "the value k2*e* or the value k2*c*". When the stroke amount zs is smaller than the reference stroke amount zs1 (when the spring device is displaced in the expansion-side), the spring constant is "the value k2*e*". Thus, this spring device satisfies the above-mentioned [condition A].

Further, as understood from FIG. 15B, the spring constant when the stroke amount zs is larger than or equal to the stroke amount (zs1+α) which is larger than the reference stroke amount zs1 by the positive predetermined amount (α) is k2*c* (referred to a region R21). The spring constant when the stroke amount zs is less than or equal to the stroke amount (zs1−α) which is smaller than the reference stroke amount zs1 by the positive predetermined amount (α) is k2*e* (referred to a region R22). Thus, this spring device satisfies the above-mentioned [condition B].

FIG. 15C shows the "relationship between the stroke amount and the spring force" when the weight of the occupant is heavier than the normal weight. In this case, the reference stroke amount is a stroke amount zs2 larger than the stroke amount zs0. It is clear from this figure that, when the stroke amount zs is larger than the reference stroke amount zs2 (when the spring device is displaced in the contraction-side), the spring constant is "the value k2*c*". When the stroke amount zs is smaller than the reference stroke amount zs2 (when the spring device is displaced in the expansion-side), the spring constant is "the value k2*c* or the value k2*e*". Thus, this spring device satisfies the above-mentioned [condition A].

Further, as understood from FIG. 15C, the spring constant when the stroke amount zs is larger than or equal to the stroke amount (zs2+α) which is larger than the reference stroke amount zs2 by the positive predetermined amount (α) is k2*c* (referred to a region R31). The spring constant when the stroke amount zs is less than or equal to the stroke amount (zs2−α) which is smaller than the reference stroke amount zs2 by the positive predetermined amount (α) is k2*e* (referred to a region R32). Thus, this spring device satisfies the above-mentioned [condition B].

When the spring device having the "spring constant" which changes as described above is used for a vehicle, it has been revealed that the ride quality of the vehicle is improved, as described later using the gain of "transfer characteristic representing how a vibration due to unevenness of the road surface is transmitted to the occupant".

This reason can be estimated as follows, although the reason is not perfectly clear. According to the present invention device, the spring constant when the stroke amount of the spring device is a value in the contraction-side to some extent is smaller than the spring constant when the stroke amount of the spring device is a value in the expansion-side to some extent. On the other hand, as indicated by broken lines B1 and B2 that are approximation straight lines shown in FIG. 14, the spring constant of the seat generally becomes larger as the spring device more greatly contracts since the displacement amount (deflection amount) of the seating surface of the seat becomes larger as the spring device more greatly contracts in many cases. As a result, the overall spring characteristic of "the suspension device and the seat" that affects the ride quality for the occupant becomes closer to a linear characteristics. Consequently, the ride quality is improved. It should be noted that, generally, the spring constant characteristic of the tire is linear, and the spring constant of the tire is about one order of magnitude larger than the spring constant of the seat and the spring constant of the suspension device. Thus, it is considered that the influence of the spring characteristic of the tire on the ride quality of the vehicle is small.

In the suspension device for a vehicle according to one of embodiments of the present invention, the spring device comprises: a first spring (31) disposed between the sprung member and the unsprung member; and a second spring (32) disposed between the sprung member and the unsprung member.

Further, the first spring is arranged so as to be always compressed by the sprung member and the unsprung member.

The second spring is arranged in such manner that the second spring is compressed by the sprung member and the unsprung member when the stroke amount is smaller than the threshold stroke amount, and the second spring is neither compressed nor expanded by the sprung member and the unsprung member when the stroke amount is larger than the threshold stroke amount.

According to this embodiment, when the stroke amount is smaller than the threshold stroke amount, the first spring is compressed between the sprung member and the unsprung member, so that a spring force of the first spring is generated. Further, in this case, since the second spring is compressed between the sprung member and the unsprung member, the spring force of the second spring is generated. Therefore, the spring constant of the spring device in this case is equal to a sum (k1+k2) of a spring constant (k1) of the first spring and a spring constant (k2) of the second spring.

On the other hand, when the stroke amount is larger than the threshold stroke amount, the first spring is compressed between the sprung member and the unsprung member, so that the spring force of the first spring is generated. However, in this case, since the second spring is neither compressed nor expanded between the sprung member and the unsprung member, the spring force of the second spring is not generated. Therefore, the spring constant of the spring device in this case is equal to the spring constant (k1) of the first spring.

Accordingly, this embodiment is a "suspension device with superior ride quality" which satisfies the above-mentioned [condition A] and [condition B] by a simple configuration using the first spring and the second spring.

In a suspension device for a vehicle according to another embodiment of the present invention, the spring device comprises:

an air spring including a main chamber (each of 211 to 214) and a sub chamber (each of 211*s* to 214*s*) which communicates with the main chamber via a communication passage (PB), a switching valve (each of 219R, 219L, 220R, 220L) which is interposed in the communication passage and is capable of switching a state of the communication passage between a communication state and a shut-off state, and a control section (250) which sets the switching valve to the communication state when the stroke amount is larger than the threshold stroke amount (step 1320), and sets the switching valve to the shut-off state when the stroke amount is smaller than the threshold stroke amount (step 1330).

According to this embodiment, when the stroke amount is larger than the threshold stroke amount, the switching valve is set to the communication state. Thus, since the main chamber communicates with the sub chamber, a volume of a portion which can function as an air spring increases. Consequently, the spring constant becomes smaller than a spring constant when the main chamber and the sub chamber are not communicated with each other. In contrast, when the stroke amount is smaller than the threshold stroke amount, the switching valve is set to the shut-off state. Thus, since the main chamber is disconnected from the sub chamber, the volume of the portion which can function as the air spring decreases. Consequently, the spring constant becomes larger than the spring constant when the main chamber is communicated with the sub chamber.

Accordingly, this embodiment is also a "suspension device with superior ride quality" which satisfies the above-mentioned [condition A] and [condition B].

In the description given above, in order to facilitate understanding of the present invention, names and/or reference symbols used in embodiments of the present invention described below are enclosed in parentheses, and are assigned to elements of the invention corresponding to the embodiment. However, the respective elements of the present invention are not limited to the embodiment defined by the reference symbols. Other objects, other features, and accompanying advantages of the present invention are readily understood from a description of the embodiment of the present invention to be given referring to the following drawings.

DESCRIPTION OF THE EMBODIMENTS

First Embodiment

Figure 1:
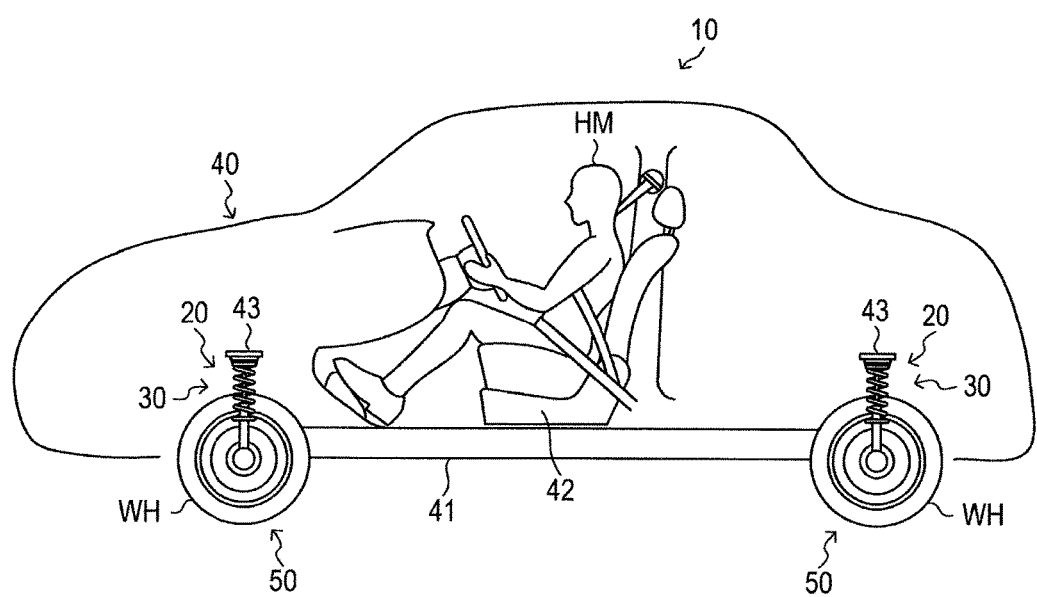
FIG. 1 is a schematic diagram for illustrating a vehicle to which a suspension device for a vehicle according to a first embodiment of the present invention is applied.

A suspension device for a vehicle according to a first embodiment of the present invention is applied to a vehicle 10 illustrated in FIG. 1. The vehicle 10 includes suspension devices 20, a sprung member 40, and unsprung members 50. The sprung member 40 includes a vehicle body 41, seats 42 on which occupants HM of the vehicle sit, and mount portions 43. Each of the unsprung members 50 includes a wheel WH.

Figure 2:
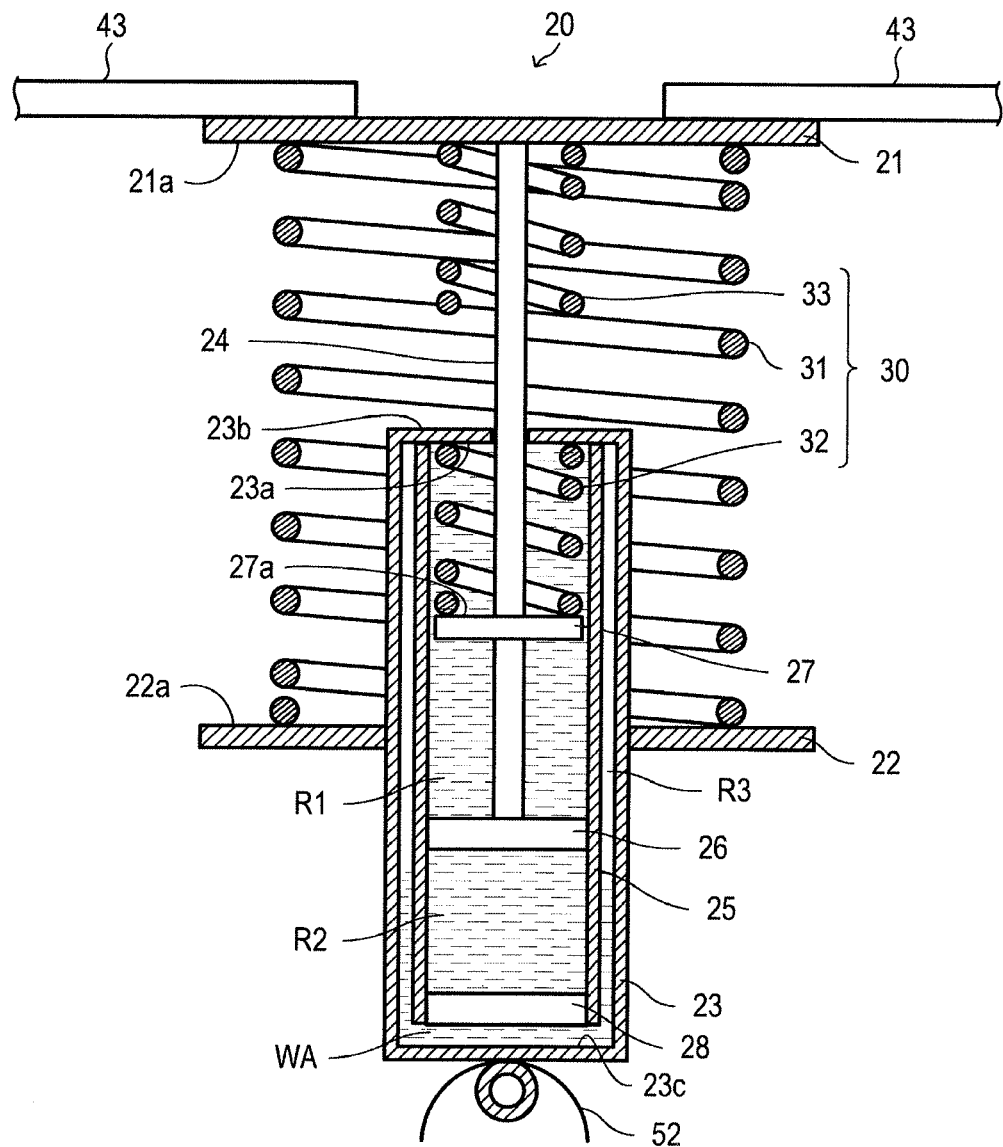
FIG. 2 is a cross-sectional view along a central axis for illustrating a suspension device for a vehicle according to a first embodiment of the present invention.

As illustrated in FIG. 2, each of the suspension devices 20 includes an upper retainer 21, a lower retainer 22, a cylinder housing 23, a piston rod 24, an inner tube 25, a piston 26, an annular plate 27, a base valve 28, and a spring device 30

The upper retainer 21 is a member having a disk shape and is fixed to the mount portion 43 of the sprung member 40. The lower retainer 22 is a member having an annular shape. The cylinder housing 23 is a cylindrical member having a bottom portion. The lower retainer 22 is fixed to the cylinder housing 23 on the radially outer side of the cylinder housing 23. The upper and lower surfaces of the lower retainer 22 are parallel to a plane perpendicular to an axis of the cylinder housing 23.

The piston rod 24 is a member having a cylindrical shape and is arranged in such a manner that an axis of the piston rod 24 coincides with an axis of the upper retainer 21. One of ends of the piston rod 24 is fixed to the upper retainer 21. A part including the other end of the piston rod 24 is inserted into the cylinder housing 23.

The inner tube 25 is disposed inside the cylinder housing 23. The inner tube 25 is a member having a cylindrical shape, and is arranged in such a manner that an axis of the inner tube 25 coincides with the axis of the cylinder housing 23. The outer diameter of the inner tube 25 is smaller than the inner diameter of the cylinder housing 23. The upper end of the inner tube 25 is in contact with and fixed to an upper inner wall surface of the cylinder housing 23. The lower end of the inner tube 25 is spaced apart from a bottom inner wall surface 23c of the cylinder housing 23 in the axial direction. The inside of the inner tube 25 is filled with a working fluid WA (for example, oil).

The piston 26 is a member having a disk shape and is arranged in such a manner that an axis of the piston 26 coincides with the axis of the piston rod 24. The piston 26 is fixed to the other end of the piston rod 24 inserted in the cylinder housing 23 (i.e., in the inner tube 25). The outer diameter of the piston 26 is equal to the inner diameter of the inner tube 25, and the outer peripheral surface of the piston 26 is in contact with the inner peripheral surface of the inner tube 25. Accordingly, the piston 26 slides along the inner peripheral surface of the inner tube 25 when the piston 26 moves in the axial direction (up-down vertical direction). The piston 26 separates a liquid chamber formed in the inner tube 25 into an upper liquid chamber R1 and a lower liquid chamber R2. The piston 26 slides along the vertical direction between the upper liquid chamber R1 and the lower liquid chamber R2. The piston 26 includes an orifice for giving resistance to the flow of the working fluid WA between the upper liquid chamber R1 and the lower liquid chamber R2 when the piston 25 moves upward and downward to function as a piston valve for generating a damping force. Hereinafter, the piston 26 is also referred to as the "piston valve 26".

The annular plate 27 is a member having an annular shape, and is fixed to the piston rod 24 at a predetermined position inside the inner tube 25. The upper surface and the lower surface of the annular plate 27 are parallel to the plane perpendicular to the axis of the piston rod 24. The outer diameter of the annular plate 27 is smaller than the inner diameter of the inner tube 25.

A reservoir chamber R3 is formed by the cylinder housing 23 and the inner tube 25. The reservoir chamber R3 is filled with the working fluid WA and atmospheric pressure air. A base valve 28 is fixed to the inner peripheral surface of the lower end of the inner tube 25.

The base valve 28 includes an orifice for giving resistance to the flow of the working fluid WA between the lower liquid chamber R2 and the reservoir chamber R3 when the piston 25 moves upward and downward to generate a damping force.

As described above, a shock absorber which can generate the damping force is constituted by the cylinder housing 23, the inner tube 25, the piston 26, the oil in the liquid chamber OR, the working fluid WA in the reservoir RS, and the like.

The spring device 30 includes a first coil spring 31, a second coil spring 32, and a third coil spring 33. FIG. 2 shows a state of the spring device 30 when an occupant (one person) HM with standard weight is seated/sits on the seat 42 and the vehicle 10 remains stationary on the horizontal plane. Hereinafter, this state is also referred to as a "neutral state". The definition of this neutral state is also applicable to the other spring devices described later. Furthermore, a length of the spring device 30 (distance between the upper retainer 21 and the lower retainer 22) in the neutral state is also referred to as a "reference length". The spring device 30 in the "neutral state" will next be described.

The first coil spring 31 is arranged in such a manner that an axis of the first coil spring 31 coincides with the axis of the upper retainer 21. The inner diameter of the first coil spring 31 is larger than the outer diameter of the cylinder housing 23. The first coil spring 31 is disposed/arranged so as to be constantly compressed vertically (in the axis direction) between the upper retainer 21 and the lower retainer 22.

The state of being "constantly compressed" means a state in which the spring is compressed between the lower surface 21a and the upper surface 22a even in a state (hereinafter, also referred to as a "full rebound state") in which a distance between the lower surface 21a of the upper retainer 21 and the upper surface 22a of the lower retainer 22 becomes maximum. In other words, the distance between the lower surface 21a and the upper surface 22a in the full rebound state is shorter than a natural length of the first coil spring 31. That is, in a movable range of the suspension device 20, the first coil spring 31 is constantly/always compressed.

The second coil spring 32 is arranged in such a manner that an axis of the second coil spring 32 coincides with the axis of the annular plate 27. The outer diameter of the second coil spring 32 is smaller than the inner diameter of the inner tube 25. One of ends of the second coil spring 32 is fixed to the upper surface 27a of the annular plate 27. The other end of the second coil spring 32 is in contact with the upper inner wall surface 23a of the cylinder housing 23 in such a manner that the second coil spring 32 is compressed. In other words, in the neutral state shown in FIG. 2, a distance between the upper surface 27a of the annular plate 27 and the upper inner wall surface 23a of the cylinder housing 23 is equal to a natural length of the second coil spring 32. That is, the "predetermined position" at which the annular plate 27 is fixed means the position that has the distance between the upper surface 27a of the annular plate 27 and the upper inner wall surface 23a of the cylinder housing 23 be equal to the natural length of the second coil spring 32 in the neutral state.

The third coil spring 33 is arranged in such a manner that an axis of the third coil spring 33 coincides with the axis of the upper retainer 21. The outer diameter of the third coil spring 33 is smaller than any one of the inner diameter of the first coil spring 31 and the inner diameter of the cylinder housing 23. One of ends of the third coil spring 33 is fixed to the lower surface 21a of the upper retainer 21. The other end of the third coil spring 33 is axially spaced apart from an upper outer wall surface 23b of the cylinder housing 23. Thus, the length of the third coil spring 33 is equal to a natural length of the coil spring 33 in this state, so that the third coil spring 33 does not work (function) as a spring. The third coil spring 33 functions as a bound stopper to prevent the upper outer wall surface 23b from contacting with the lower portion of the upper retainer 21 at the time of the full bounce.

The lower portion of the cylinder housing 23 is fixed to a lower arm 52 of the unsprung member 50. That is, it can be said that the suspension device 20 is arranged between the sprung member 40 and the unsprung member 50, and has the spring device 30 which elastically supports the sprung member 40 with respect to the unsprung member 50.

Figure 3:
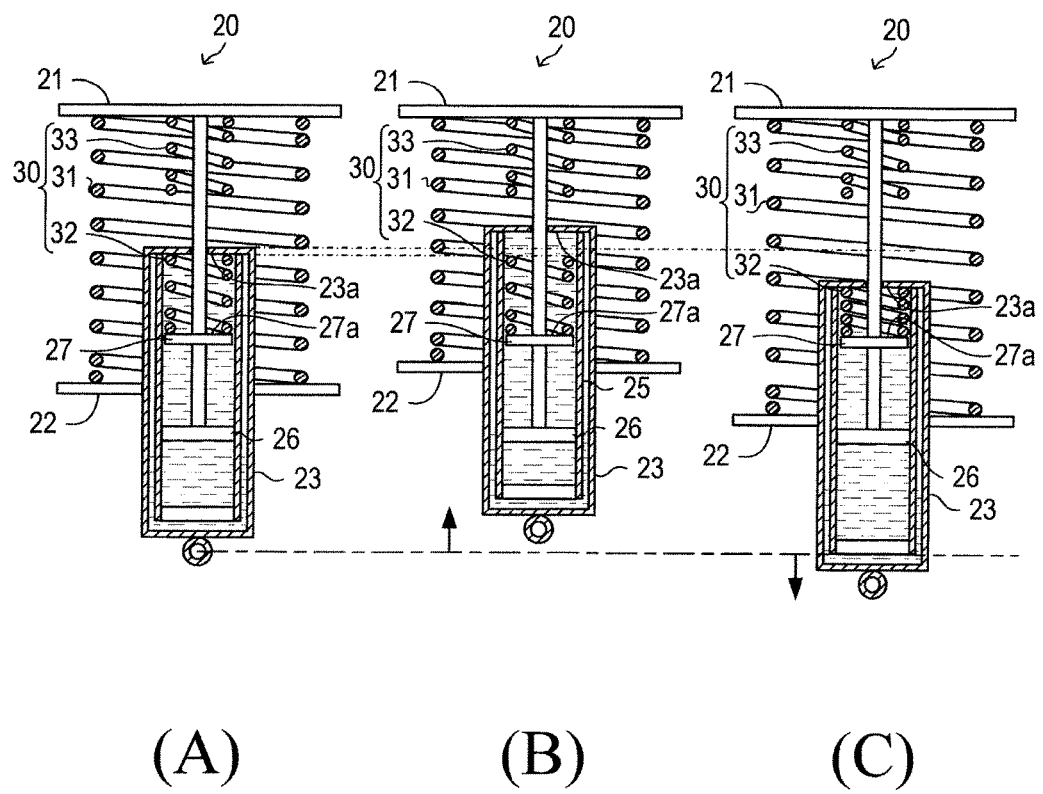
FIG. 3 includes (A) to (C), and shows cross-sectional views for explaining operation of the suspension device illustrated in FIG. 2.

The operation of the suspension device 20 will next be described with reference to FIG. 3 including (A) to (C). (A) of FIG. 3 shows a state of the spring device 30 when the length of the spring device 30 is the reference length (i.e., when the spring device 30 is in the neutral state). (B) of FIG. 3 shows a state of the spring device 30 when the length of the spring device 30 is shorter than the reference length (i.e., when the spring device 30 is contracted as compared with the neutral state, that is, when the spring device 30 is in a bounding state). (C) of FIG. 3 shows a state of the spring device 30 when the length of the spring device 30 is longer than the reference length (i.e., when the spring device 30 is expanded as compared with the neutral state, that is, when the spring device 30 is in a rebounding state). It should be noted that description on a full-bounding state when the third coil spring 33 functions as the bound stopper will be omitted.

Hereinafter, the spring constant of the first coil spring 31 is ks1, the spring constant of the second coil spring 32 is ks2, and the spring constant of the third coil spring 33 is ks3.

When the suspension device 20 is in the state shown in (B) of FIG. 3, the distance between the upper retainer 21 and the lower retainer 22 becomes shorter than the reference length of the spring device 30. Thus, the first coil spring 31 is further compressed as compared with the case where it is in the neutral state. In this case, since the annular plate 27 fixed to the piston rod 24 relatively moves downwardly in the cylinder housing 23, the distance between the upper portion (upper inner wall surface 23a) of the cylinder housing 23 and the annular plate 27 (upper surface 27a of the annular plate 27) becomes longer.

Consequently, the second coil spring 32 becomes apart from the upper inner wall surface 23a in the axial direction of the second coil spring 32. Thus, when the length of the spring device 30 is shorter than the reference length (i.e., when the spring device 30 is contracted as compared with the neutral state), the second coil spring 32 does not work (function) as a spring. Therefore, in this state, the spring constant k2c of the spring device 30 is equal to the spring constant ks1 of the first coil spring 31.

In contrast, when the suspension device 20 is in the state shown in (C) of FIG. 3, the distance between the upper retainer 21 and the lower retainer 22 is longer than the reference length of the spring device 30. Thus, although the first coil spring 31 is in the compressed state, the length of the first coil spring 31 is longer than the length of the first coil spring 31 in the neutral state. In other words, the length of the first coil spring 31 further approaches the natural length. In this case, since the annular plate 27 fixed to the piston rod 24 relatively approaches the upper portion of the cylinder housing 23, the distance between the upper portion of the cylinder housing 23 (upper inner wall surface 23a) and the annular plate 27 (upper surface 27a of the annular plate 27) becomes shorter.

Consequently, the second coil spring 32 is compressed between the upper inner wall surface 23a and the upper surface 27a of the annular plate 27. That is, when the length of the spring device 30 is longer than the reference length (i.e., when the spring device 30 is expanded relatively to the neutral state), the second coil spring 32 acts (functions) as a spring. Thus, the spring constant k2e of the spring device 30 in this case is equal to the sum (=ks1+ks2) of the spring constant ks1 of the first coil spring 31 and the spring constant ks2 of the second coil spring 32.

As described above, the spring constant of the spring device 30 is switched between the spring constant k2c (=ks1) in the bound state and the spring constant k2e (=ks1+ks2) in the rebound state, depending on whether or not the length of the spring device 30 is longer than the reference length.

Figure 4A:
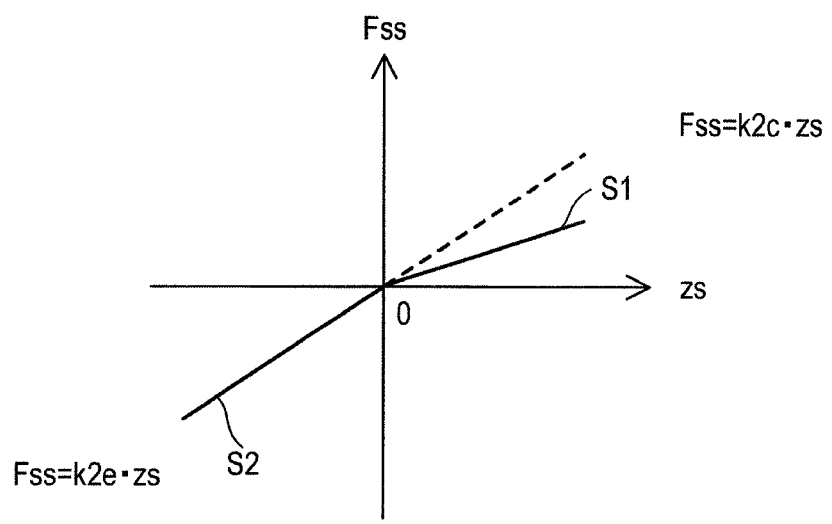
FIG. 4A is a graph for showing a relation between a spring displacement and a spring force generated by a seat.

FIG. 4A shows the relationship between the displacement amount zs from the reference length of the spring device 30 and the spring force Fss of the spring device 30. The displacement amount zs in FIG. 4A is a positive value when the length of the spring device 30 is shorter than the reference length (bound state), and is a negative value when the length of the spring device 30 is longer than the reference length (rebound state). As understood from FIG. 4A, the spring device 30 has the spring constant k2c (an inclination of the straight line S1) in a state in which the length of the spring device 30 is shorter than the reference length, and the spring device 30 has the spring constant k2e (an inclination of the straight line S2) in a state in which the length of the spring device 30 is longer than the reference length. That is, the straight line S1 is represented by the expression Fss=k2c·zs, and the straight line S2 is represented by the expression Fss=k2e·zs.

Figure 4B:
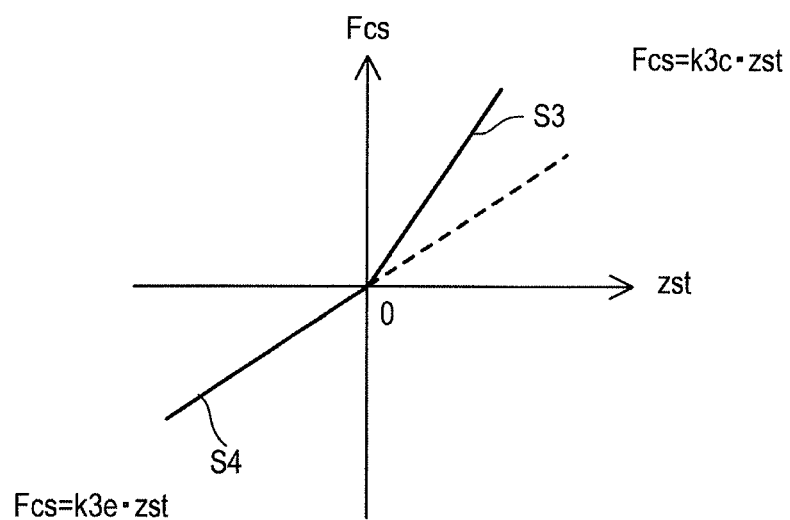
FIG. 4B is a graph for showing a relation between a spring displacement and a spring force generated by a suspension device.
Figure 14:
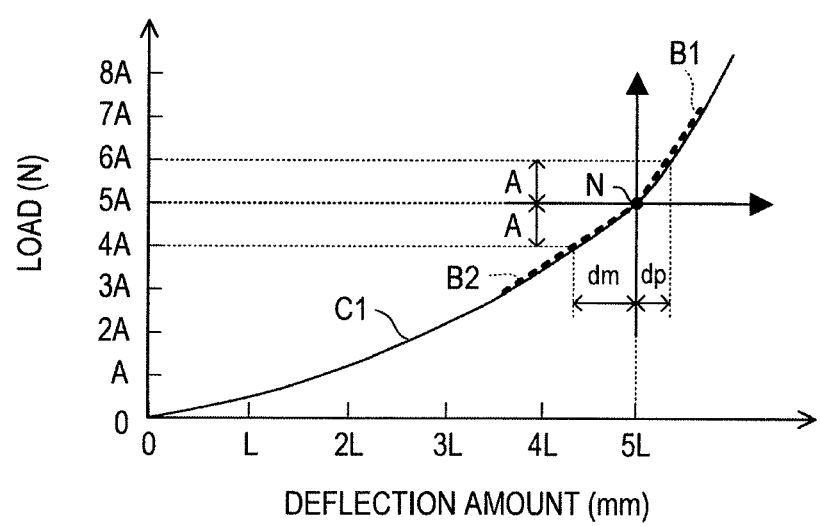
FIG. 14 is a graph for showing a relation between a load of a seat and a deflection amount.

Meanwhile, FIG. 4B shows a relationship between a displacement amount zst from a reference deflection amount and a spring force Fcs of the seat portion of the seat 42, where in the reference deflection amount is the displacement amount (that is, the deflection amount) of the seating surface (the upper surface of the seated portion) of the seat 42 when an occupant (one person) HM with the normal weight sits on the seat 42. The deflection amount zst shown in FIG. 4B is a positive value when the displacement amount of the seating surface is larger than the reference deflection amount, and is a negative value when the displacement amount of the seating surface is smaller than the reference deflection amount. As understood from FIG. 4B, the seat portion of the seat 42 can be regarded as a spring device having a characteristic that the spring device has a spring constant k3c (an inclination of the straight line S3) when the displacement amount zst of the seating surface is a positive value, and has a spring constant k3e (an inclination of the straight line S4) when the displacement amount zst of the seating surface is a negative value. That is, the straight line S3 is represented by the expression Fcs=k3c·zst, and the straight line S4 is represented by the expression Fcs=k3c·zst. The spring constant k3c is larger than the spring constant k3e (k3c>k3e). This has already been described with reference to FIG. 14.

When the length of the spring device 30 is shorter than the reference length (in the bound state), since the seat portion of the seat 42 also deflects greatly, the displacement amount of the seating surface is considered to be a positive value. In contrast, when the length of the spring device 30 is longer than the reference length (in the rebound state), since the degree of deflection of the seat portion of the seat 42 becomes smaller, the displacement amount of the seating surface is considered to be a negative value. In view of the above, it can be said that the characteristic of the spring constant of the spring device 30 and the characteristic of the spring constant of the seat 42 have an "opposite (reverse) relation" to each other, depending on whether or not the length of the spring device 30 is longer than the reference length.

The effect of the suspension device 20 will next be described with reference to FIGS. 5 and 6. First, in order to analyze the vibration received by the occupant HM on the seat 42 of the vehicle 10, a three-degrees-of-freedom single wheel model shown in FIG. 5 will be discussed.

Figure 5:
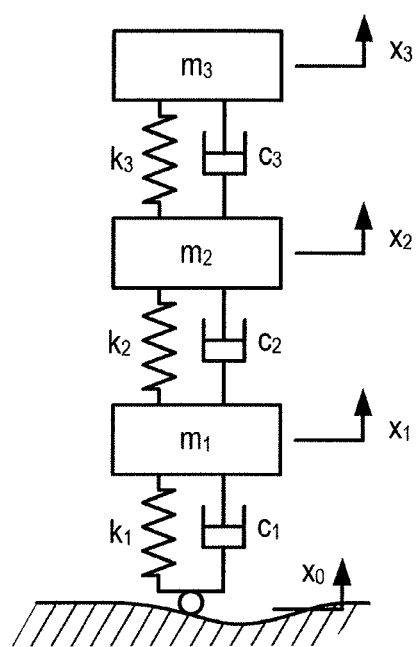
FIG. 5 is a diagram for explaining a three-degree-of-freedom single wheel model of the vehicle illustrated in FIG. 1.

Symbols shown in FIG. 5 are as follows.
x0: Road surface vertical displacement input [mm],
x1: vertical displacement of unsprung member [mm],
x2: vertical displacement of sprung member (vehicle body and seat) [mm],
x3: vertical displacement of occupant [mm]
m1: unsprung member mass [kg],
m2: sprung member (vehicle body and seat) mass [kg],
m3: occupant mass [kg]
k1: spring constant of tire [N/mm],
k2: spring constant of spring device [N/mm],
k3: spring constant of seat [N/mm],
c1: damping coefficient of tire [Ns/m],
c2: damping coefficient of shock absorber [Ns/m],
c3: damping coefficient of seat [Ns/m]
Assuming that the unsprung displacement is $z_w$ and the sprung displacement is $z_b$, When $z_w - z_b = 0$, the spring device 30 is in the neutral state (reference length).

When $z_w - z_b > 0$, the spring device 30 is in the contracted state from the reference length.

When $z_w - z_b < 0$, the spring device 30 is in the extended state from the reference length.

When $\dot{z}_w - \dot{z}_b > 0$, the first device 20 is in contraction.

When $\dot{z}_w - \dot{z}_b < 0$, the first device 20 is in extension.

$$k2 = \begin{cases} k2a & (z_w - z_b > 0) \\ k2b & (z_w - z_b \leq 0) \end{cases}$$

$$k3 = \begin{cases} k3a & (z_w - z_b > 0) \\ k3b & (z_w - z_b \leq 0) \end{cases}$$

$$c2 = \begin{cases} c2a & (\dot{z}_w - \dot{z}_b > 0) \\ c2b & (\dot{z}_w - \dot{z}_b \leq 0) \end{cases}$$

$$c3 = \begin{cases} c3a & (\dot{z}_w - \dot{z}_b > 0) \\ c3b & (\dot{z}_w - \dot{z}_b \leq 0) \end{cases}$$

The equation of motion of the above model is expressed by the following equations (1) to (6). Meanwhile, an influence of the vibration (road surface vibration) which the occupant receives from the road surface is grasped from the transfer characteristic G3 with the road surface velocity v0 (first order differentiation of road surface vertical displacement x0) [m/s] as input and the occupant acceleration a3 (second order differentiation of vertical displacement of occupant x3) [m/s²] as the output.

$$m_3 \ddot{x}_3 = f_3 \qquad (1)$$

$$m_2 \ddot{x}_2 = -f_3 + f_2 \qquad (2)$$

$$m_1 \ddot{x}_1 = -f_2 + f_1 \qquad (3)$$

$$f_3 = k_3(x_2 - x_3) + c_3(\dot{x}_2 - \dot{x}_3) \qquad (4)$$

$$f_2 = k_2(x_1 - x_2) + c_3(\dot{x}_1 - \dot{x}_2) \qquad (5)$$

$$f_1 = k_1(x_0 - x_1) + c_3(\dot{x}_0 - \dot{x}_1) \qquad (6)$$

Therefore, the frequency characteristic of the transfer characteristic G3 is calculated based on the equations of motion of equations (1) to (6) under the two conditions respectively shown in the following Tables 1 and 2. An example of the calculated frequency characteristic of the transfer characteristic G3 is shown in FIG. 6.

(Condition 1)

TABLE 1

| SYMBOL | UNIT | BOUND | REBOUND | CON-TRACTION | EXTEN-SION |
|---|---|---|---|---|---|
| m1 | kg | 50 | ← | ← | ← |
| m2 | kg | 400 | ← | ← | ← |
| m3 | kg | 50 | ← | ← | ← |
| k1 | N/mm | 300 | 300 | — | — |
| k2 | N/mm | 10 | 50 | — | — |
| k3 | N/mm | 40 | 20 | — | — |
| c1 | Ns/m | — | — | 100 | 100 |
| c2 | Ns/m | — | — | 1000 | 2000 |
| c3 | Ns/m | — | — | 2000 | 1000 |

As shown in Table 1, in Condition 1, the spring constant k2 of the spring device 30 is set to 20 [N/mm] in the bound state and 40 [N/mm] in the rebound state. As described above, the spring constant ksc of the suspension device 20 in the bound state is equal to the spring constant ks1 of the first coil spring 31. On the other hand, the spring constant kse of the suspension device 20 in the rebound state is equal to the sum (ks1+ks2) of the spring constant ks1 of the first coil spring 31 and the spring constant ks2 of the second coil spring 32. Thus, the conditions shown in Table 1 correspond to the case where the value of the spring constant ks1 of the first coil spring 31 is 20 [N/m], and the value of the spring constant ks2 of the second coil spring 32 is 20 [N/mm].

(Condition 2)

TABLE 2

| SYMBOL | UNIT | BOUND | REBOUND | CON-TRACTION | EXTEN-SION |
|---|---|---|---|---|---|
| m1 | kg | 50 | ← | ← | ← |
| m2 | kg | 400 | ← | ← | ← |
| m3 | kg | 50 | ← | ← | ← |
| k1 | N/mm | 300 | 300 | — | — |
| k2 | N/mm | 30 | 30 | — | — |
| k3 | N/mm | 40 | 20 | — | — |
| c1 | Ns/m | — | — | 100 | 100 |
| c2 | Ns/m | — | — | 1000 | 2000 |
| c3 | Ns/m | — | — | 2000 | 1000 |

Condition 2 shown in Table 2 is a condition for calculating the characteristics of the conventional suspension device serving as the comparison of the suspension device 20. When the vehicle is traveling under condition 1, the time average value of the spring constant k2 of the second coil spring 32 which repeats the bound state and the rebound state is approximately equal to 30 [N/mm]. Therefore, in condition 2, the spring constant k2 of the spring device 30 is set to 30 [N/mm] in both the bound state and the rebound state. Consequently, the spring constant k2 of the condition 1 and the spring constant k2 of the condition 2 are equivalent, and thus, an influence caused by the difference in the spring constant on the simulation is eliminated.

Figure 6:
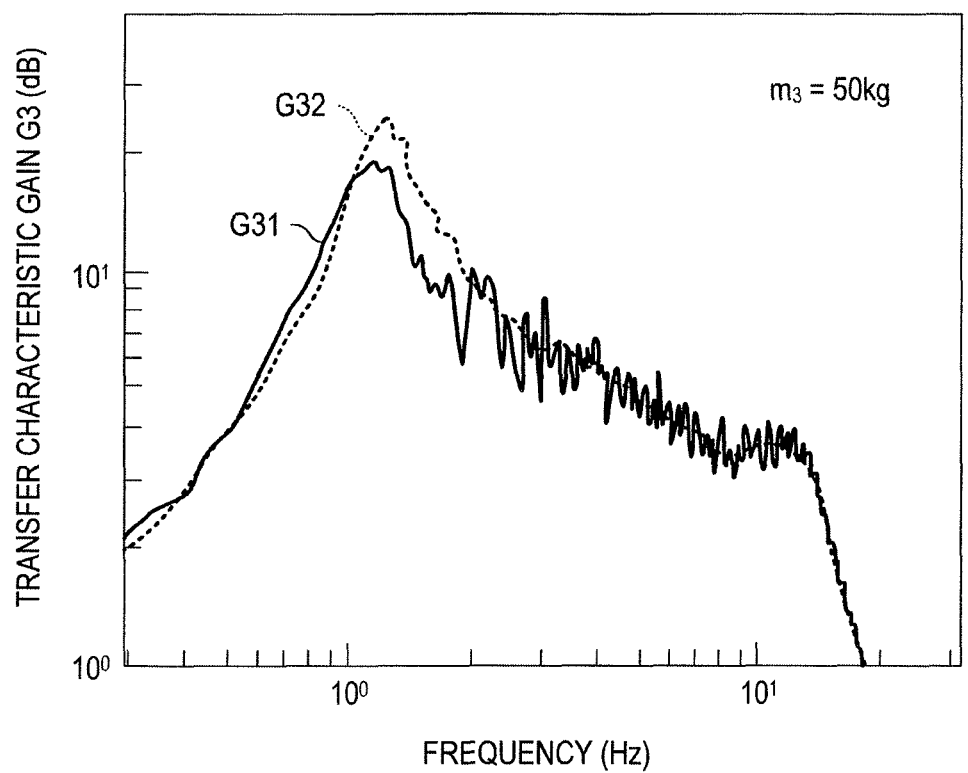
FIG. 6 is a graph showing a transfer characteristic of occupant acceleration with respect to a road surface velocity calculated based on the model illustrated in FIG. 5.

The solid line shown in FIG. 6 indicates the frequency characteristic of the transfer characteristic gain G31 based on condition 1, which is the transfer characteristic gain with the road surface velocity v0 [m/s] as input and the occupant acceleration a3 [m/s²] as the output. The broken line in FIG. 6 indicates the frequency characteristic of the transfer characteristic gain G32 based on condition 2, which is the transfer characteristic gain with the road surface velocity v0 [m/s] as input and the occupant acceleration a3 [m/s²] as the output.

As understood from FIG. 6, the transfer characteristic gain G31 is smaller than the transfer characteristic gain G32 in the low frequency region (a resonance region of the sprung member) between about 1 and 2 Hz. More specifically, the peak frequency of the transfer characteristic gain G31 is substantially equal to the peak frequency of the transfer characteristic gain G32, but the magnitude of the peak of the transfer characteristic gain G31 is smaller than the magnitude of the peak of the transfer characteristic gain G32. That is, the gain (vibration amplitude) of the suspension device 20 (condition 1) is lower than the gain of the conventional device (condition 2) in the resonance region of the sprung member. Accordingly, the result shown in FIG. 6 indicates that the road surface vibration transmitted to the occupant HM is reduced by changing the configuration of the suspension device from the conventional device to the suspension device 20.

The simulation shown in FIG. 6 is carried out, when the weight of the occupant HM is the normal weight (50 kgf). When the weight of the occupant HM is the normal weight (50 kgf), the length of the second coil spring 32 is equal to the natural length. Accordingly, the simulation result shown in FIG. 6 is about the suspension device 20 having the spring device 30 whose upper end of the second coil spring 32 abuts on the upper inner wall surface 23a of the cylinder housing 23 when the seat load by the occupant HM is 50 kgf.

Figure 7A:
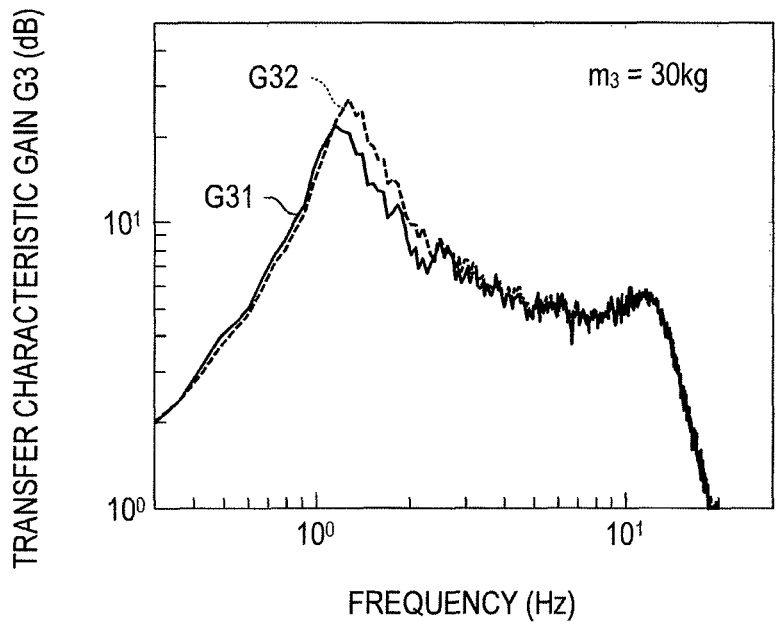
FIGS. 7A and 7B are graphs showing a transfer characteristic of occupant acceleration with respect to a road surface velocity calculated based on the model illustrated in FIG. 5.
Figure 7B:
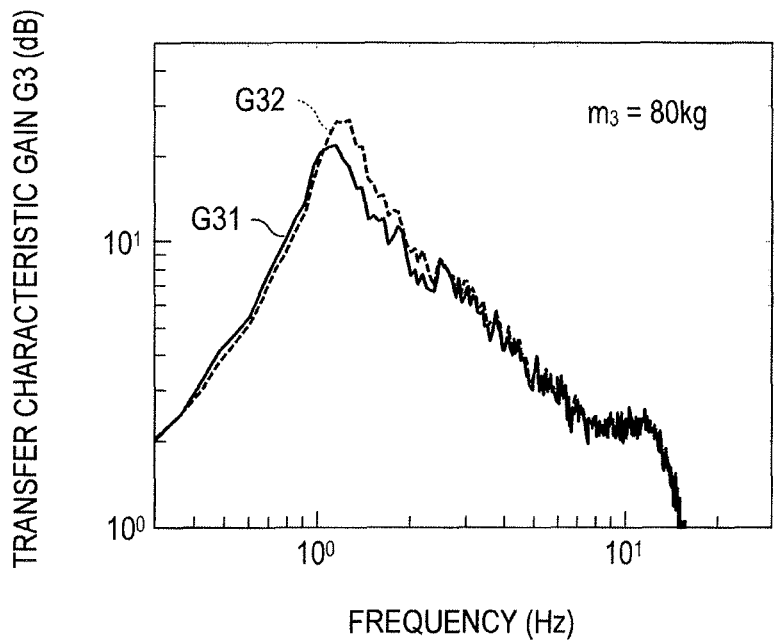

However, in reality, the weight of the occupant HM is different from the normal weight in most cases. That is, the seat load by the occupant HM is not always 50 kgf. Therefore, simulations similar to the above were conducted for a case where the seat load by the occupant HM was 30 kgf (m3=30 kg), and for a case where the seat load by the occupant HM was 80 kgf (m3=80 kg). The solid line in FIG. 7A indicates the simulation result in the case where the seat load is 30 kgf. The solid line in FIG. 7B indicates the simulation result in the case where the seat load is 80 kgf. In FIGS. 7A and 7B, similarly to FIG. 6, the broken lines indicate the simulation result of the device (the conventional device) whose spring constant of the second coil spring 32 remains constant over the entire stroke range.

As understood from FIGS. 7A and 7B, the road surface vibration transmitted to the occupant HM is reduced when the suspension device 20 is used as compared with the conventional device both in the case where the seat load is 30 kgf and in the case where the seat load is 80 kgf, similarly to the case whose result is shown in FIG. 6. That is, it is understood that the peak of the transfer characteristic gain of the resonance frequency region (about 1 to 2 Hz) of the sprung member of the suspension device 20 is lower than that of the conventional device. Thus, the suspension device 20 can reduce the road surface vibration transmitted to the occupant HM regardless of the weight of the occupant HM.

Figure 15A:
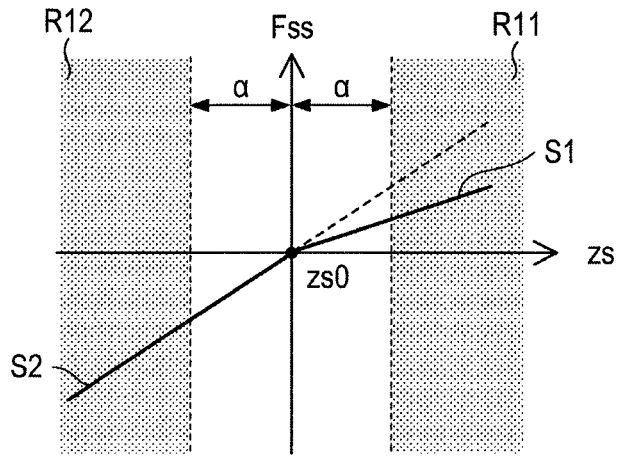
FIGS. 15A to 15C are graphs for showing a relation between a spring force and a stroke amount of a spring device according to an embodiment of the present invention.
Figure 15B:
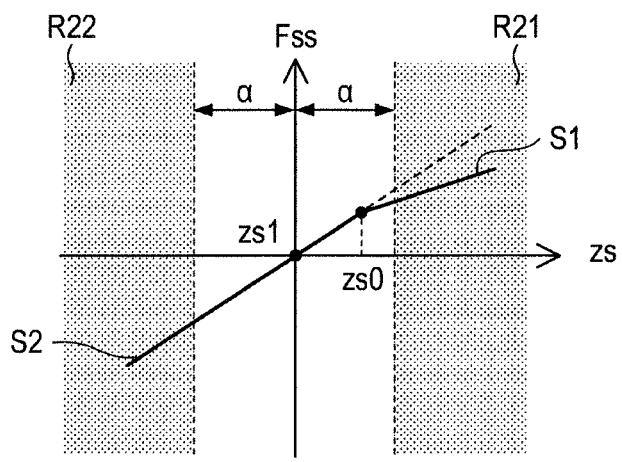
Figure 15C:
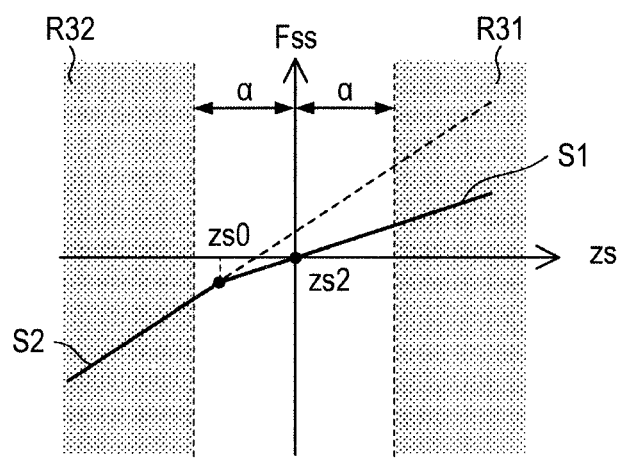

Here, a value obtained by subtracting the length of the spring device 30 from the predetermined reference length is defined as a stroke amount of the spring device 30, and a stroke amount of the spring device 30 in a "case where the occupant HM having an arbitrary weight sits on the seat 42 and the vehicle 10 is stationary on the horizontal plane" is defined as a reference stroke amount. In this case, the stroke amount increases in the positive direction as the spring device 30 becomes shorter. According to the definitions, the suspension device 20 has the characteristics represented by the straight lines S1 and S2 shown in FIGS. 15A to 15C. From FIGS. 15A to 15C, it can be said that the suspension device 20 is a device which satisfies the following [condition a] and [condition b]. Note that, FIG. 15A shows the characteristics when the weight of the occupant HM is the normal weight. In this case, the reference stroke amount is a value zs0. FIG. 15B shows the characteristics when the weight of the occupant HM is lighter than the normal weight. In this case, the reference stroke amount is a value zs1 smaller than the value zs0. FIG. 15C shows the characteristics when the weight of the occupant HM is heavier than the normal weight. In this case, the reference stroke amount is a value zs2 larger than the value zs0.

[Condition a] The spring constant KL when the stroke amount zs is larger than the reference stroke amount is smaller than or equal to the spring constant KS when the stroke amount zs is smaller than the reference stroke amount.

[Condition b] The spring constant (k2c=ks1) when the stroke amount zs is larger than or equal to the stroke amount which is larger than the reference stroke amount by a positive predetermined amount (α) is smaller than the spring constant (k2e=ks1 ks2) when the stroke amount zs is smaller than or equal to the stroke amount which is smaller than the reference stroke amount by the positive predetermined amount (α).

More specifically, the suspension device 20 includes a first spring (first coil spring) 31 which is always compressed between the sprung member 40 and the unsprung member 50. Further, the suspension device 20 includes a second spring (second coil spring) 32 which is "compressed between the sprung member 40 and the unsprung member 50" when the stroke amount is smaller than a predetermined threshold stroke amount (for example, the reference stroke amount zs0 when the length of the spring device 30 is the reference length), and is "neither contracted nor expanded between the sprung member 40 and the unsprung member 50" so as not to act as a spring when the stroke amount is larger than the predetermined threshold stroke amount.

Consequently, the suspension device 20 can reduce the road surface vibration transmitted from the road surface to the occupant in consideration of the spring characteristics of the seat 42. As a result, the suspension device 20 can improve the ride quality of the vehicle 10.

Modification of First Embodiment

A suspension device 20A for a vehicle according to a modification of the first embodiment of the present invention will be described. The suspension device 20A differs from the suspension device 20 in that the second coil spring 32 is provided/arranged outside the cylinder housing 23. Thus, this difference will be mainly described.

Figure 8:
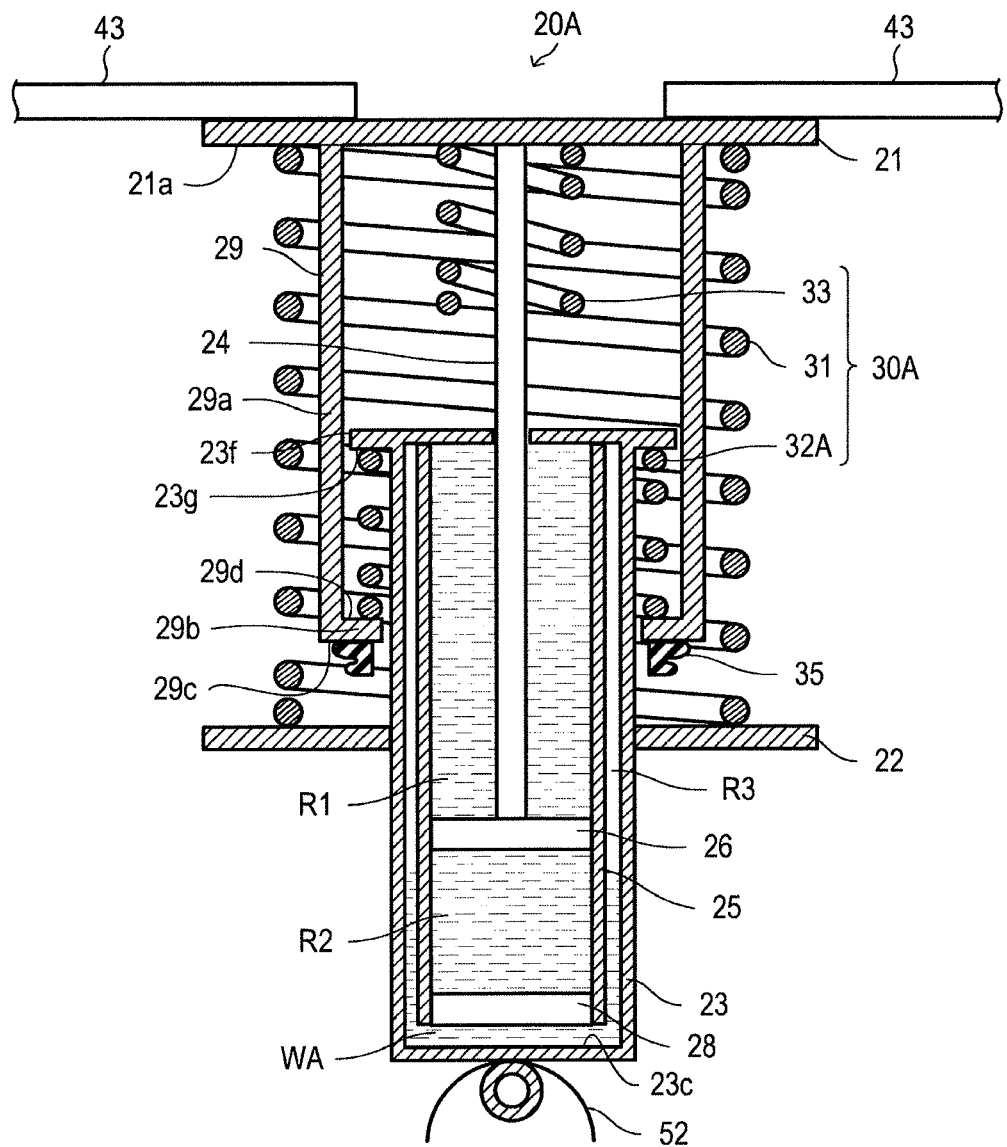
FIG. 8 is a cross-sectional view along a central axis for illustrating a suspension device for a vehicle according to a modified example of a first embodiment of the present invention.

As shown in FIG. 8, the suspension device 20A includes an upper retainer 21, a lower retainer 22, a cylinder housing 23, a flange portion 23f, a piston rod 24, a piston 26, an annular plate 27, a bracket 29 and a spring device 30A.

The bracket 29 has a cylindrical portion 29a and an annular portion 29b. The cylindrical portion 29a has a cylindrical shape. The inner diameter of the cylindrical portion 29a is larger than the outer diameter of the cylinder housing 23 (actually, the outer diameter of the flange portion 23f described above). The outer diameter of the cylindrical portion 29a is smaller than the inner diameter of the first coil spring 31. The annular portion 29b is integrated with the cylindrical portion 29a and is a portion which protrudes radially inward from the lower end of the cylindrical portion 29a. The diameter of the radially inner end of the annular portion 29b is larger than the outer diameter of the cylinder housing 23. The annular portion 29b forms an upper surface and a lower surface that are parallel to a surface perpendicular to the axis of the cylindrical portion 29a. The bracket 29 is arranged so that the axis of the cylindrical portion 29a and the axis of the upper retainer 21 coincide with each other. The upper end of the bracket 29 (that is, the upper end of the cylindrical portion 29a) is fixed to the lower surface 21a of the upper retainer 21. The lower end of the bracket 29 (that is, the lower surface of the annular portion 29b) is spaced apart from the lower retainer 22 in the axial direction.

A bound stopper 35 having an annular shape is fixed to the lower surface 29c of the annular portion 29b of the bracket 29. The bound stopper 35 prevents the annular portion 29b of the bracket 29 from contacting with the lower retainer 22 in the bound state.

The flange portion 23f has an annular shape and is integrated with the cylinder housing 23. The flange portion 23f extends outwardly in the radial direction of the cylinder housing 23 at the upper end of the cylinder housing 23. The outer diameter of the flange portion 23f is slightly smaller than the inner diameter of the bracket 29. The upper surface and the lower surface of the flange portion 23f are parallel to the plane perpendicular to the axis of the cylinder housing 23.

The spring device 30A includes a first coil spring 31, a second coil spring 32A and a third coil spring 33. Each of the first coil spring 31 and the third coil spring 33 has the configuration described above.

The second coil spring 32A is arranged in such a manner that the axis of the second coil spring 32A and the axis of the bracket 29 coincide with each other. The inner diameter of the second coil spring 32A is larger than the outer diameter of the cylinder housing 23. The outer diameter of the second coil spring 32A is smaller than the outer diameter of the flange portion 23f. The one end (lower end) of the second coil spring 32A is fixed to the upper surface 29d of the annular portion 29b. The other end (upper end) of the second coil spring 32A abuts on the lower surface 23g of the flange portion 23f when the spring device 30A is in the neutral state. The second coil spring 32A is not compressed when the spring device 30A is in the neutral state. In other words, in the neutral state shown in FIG. 8, the distance between the upper surface 29d of the annular portion 29b and the lower surface 23g of the flange portion 23f is equal to the natural length of the second coil spring 32A.

Figure 9:
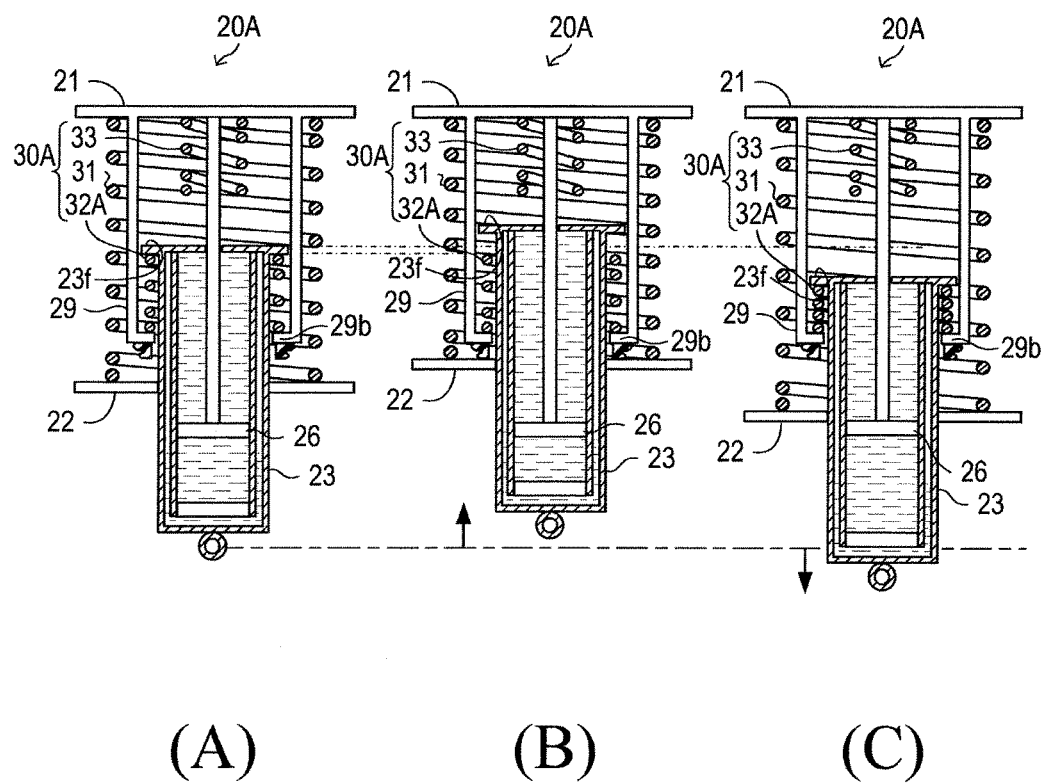
FIG. 9 includes (A) to (C), and shows cross-sectional views for explaining operation of the suspension device illustrated in FIG. 8.

Next, the operation of the suspension device 20A will be described with reference to FIG. 9 including (A) to (C). (A) of FIG. 9 shows the state of the spring device 30A when the length of the spring device 30A is equal to the reference length (i.e., when the spring device 30A is in the neutral state). (B) of FIG. 9 shows the state of the spring device 30A when the length of the spring device 30A is shorter than the reference length (i.e., when the spring device is further contracted with respect to the case in which the spring device is in the neutral state, that is, when it is in the bound state). (C) of FIG. 9 shows the state of the spring device 30A when the length of the spring device 30A is longer than the reference length (i.e., when the spring device is further expanded with respect to the case in which the spring device is in the neutral state, that is, when it is in the rebound state). It should be noted that the description of the state at the time of the full bounce in which the third coil spring 33 functions as a bound stopper is omitted, hereinafter.

Hereinafter, the spring constant of the first coil spring 31 is ks1, the spring constant of the second coil spring 32A is ks2A, and the spring constant of the third coil spring 33 is ks3.

When the suspension device 20A is in the state shown in (B) of FIG. 9, the distance between the upper retainer 21 and the lower retainer 22 is shorter than the reference length of the spring device 30A. Thus, the first coil spring 31 is further compressed as compared with the case where the spring device is in the neutral state. In this case, since the bracket 29 fixed to the upper retainer 21 relatively moves downward with respect to the cylinder housing 23, the distance between the flange portion 23f formed at the upper portion of the cylinder housing 23 and the annular portion 29b of the bracket 29 becomes longer.

Consequently, the second coil spring 32A is spaced apart from the lower surface 23g of the flange portion 23f in the axial direction. Thus, when the length of the spring device 30A is shorter than the reference length (when the spring device 30A is further contracted with respect to the case in which the spring device is in the neutral state), the second coil spring 32A does not act (function) as a spring. Therefore, the spring constant k2cA of the spring device 30A in this case is equal to the spring constant ks1 of the first coil spring 31.

On the other hand, when the suspension device 20A is in the state shown in (C) of FIG. 9, the distance between the upper retainer 21 and the lower retainer 22 is longer than the reference length of the spring device 30A. Thus, although the first coil spring 31 is in the compressed state, the length of the first coil spring 31 is longer than the length of the first coil spring 31 in the neutral state. In other words, the length of the first coil spring 31 further approaches the natural length of the first coil spring 31. In this case, since the bracket 29 relatively approaches the upper portion of the cylinder housing 23, the distance between the flange portion 231 and the annular portion 29b of the bracket 29 becomes smaller.

Consequently, the second coil spring 32A is compressed between the lower surface 23g of the flange portion 23f and the annular portion 29b. That is, the spring constant k2eA when the length of the spring device 30A is longer than the reference length (i.e., when the spring device 30A is further expanded with respect to the case in which the spring device is in the neutral state) is equal to the sum (ks1+ks2A) of the spring constant ks1 of the first coil spring 31 and the spring constant ks2A of the second coil spring 32A.

As described above, the spring constant of the spring device 30A is switched between the spring constant k2cA (=ks1) in the bound state and the spring constant k2eA (=ks1+ks2A) in the rebound state, depending on whether or not the length of the spring device 30A is longer than the reference length.

Thus, the spring device 30A is a device which satisfies the above [condition a] and [condition b], similarly to the spring device 30. Therefore, the suspension device 20A can obtain similar operation and achieve the effect similar to that of the suspension device 20.

Second Embodiment

A suspension device 20B for a vehicle according to a second embodiment of the present invention will next be described. The suspension device 20B only differs from the suspension device 20 in that the third coil spring of the suspension device 20 abuts on the cylinder housing 23 when the spring device 30 is in the neutral state. Thus, this difference will be mainly described below.

Figure 10:
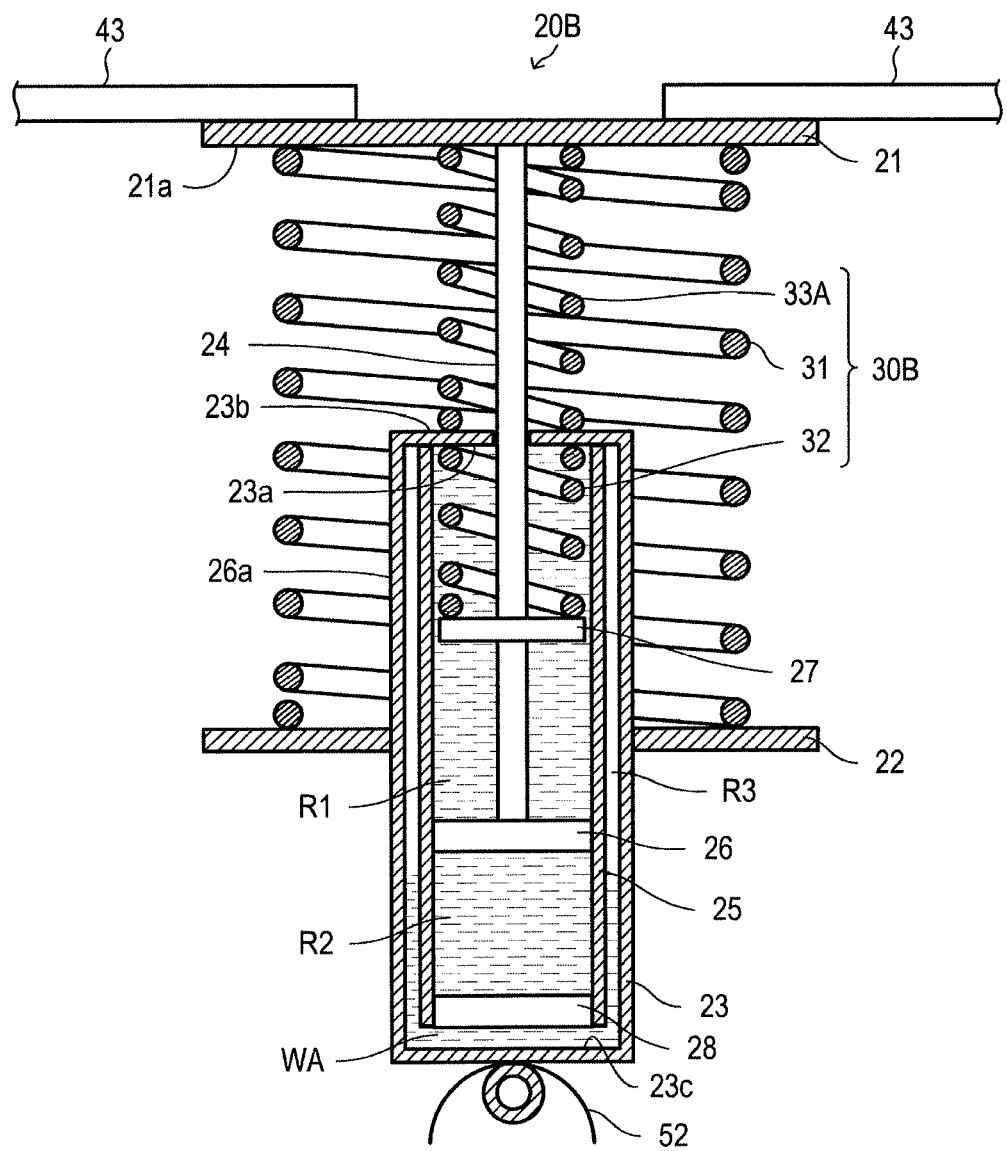
FIG. 10 is a cross-sectional view along a central axis for illustrating a suspension device for a vehicle according to a second embodiment of the present invention.

As shown in FIG. 10, the suspension device 20B includes an upper retainer 21, a lower retainer 22, a cylinder housing 23, a piston rod 24, an inner tube 25, a piston 26, an annular plate 27, a base valve 28 and a spring device 30B.

The spring device 30B includes a first coil spring 31, a second coil spring 32, and a third coil spring 33A. Each of the first coil spring 31 and the second coil spring 32 has the configuration described above.

The third coil spring 33A is arranged in such a manner that an axis of the third coil spring 33A and the axis of the upper retainer 21 coincide with each other. The outer diameter of the third coil spring 33A is smaller than the inner diameter of the first coil spring 31. One end (upper end) of the third coil spring 33A is fixed to the lower surface 21a of the upper retainer 21. The third coil spring 33A is not compressed when the spring device 30B is in the neutral state. Thus, the other end (lower end) of the third coil spring 33A abuts on the upper outer wall surface 23b of the cylinder housing 23 when the spring device 30B is in the neutral state. In other words, in the neutral state shown in FIG. 10, the distance between the lower surface 21a of the upper retainer 21 and the upper outer wall surface 23b of the cylinder housing 23 is equal to the natural length of the third coil spring 33A.

Figure 11:
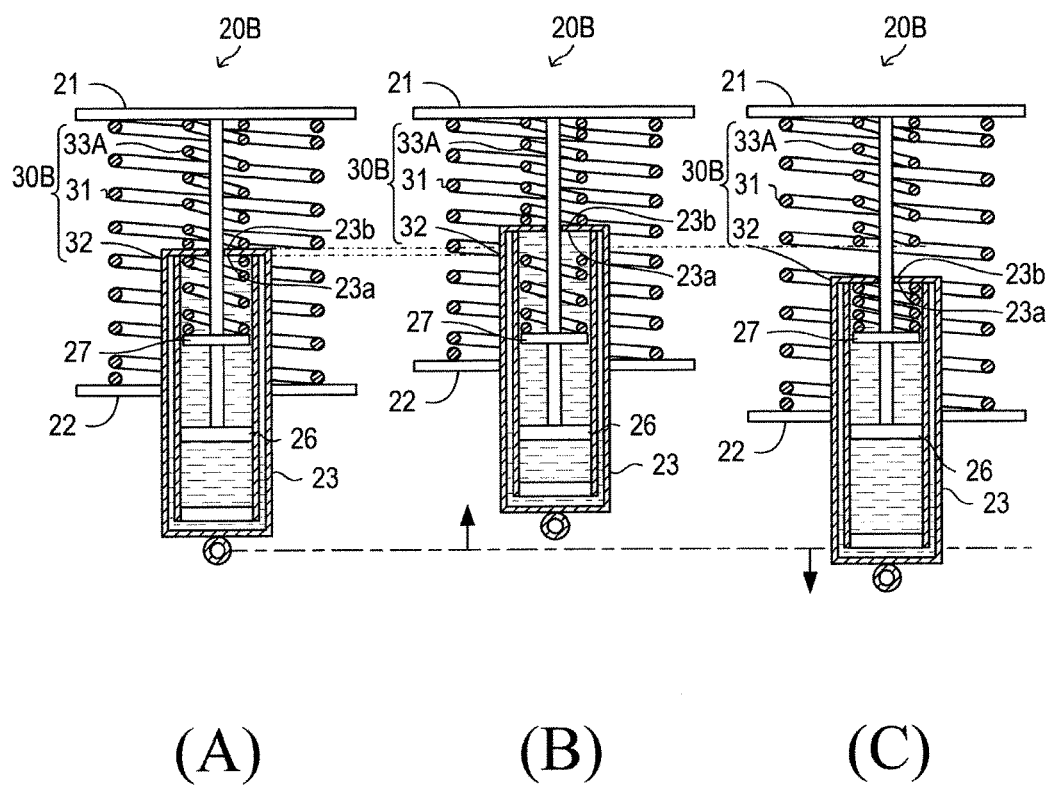
FIG. 11 includes (A) to (C), and shows cross-sectional views for explaining operation of the suspension device illustrated in FIG. 10.

The operation of the suspension device 20B will next be described with reference to FIG. 11 including (A) to (C). (A) of FIG. 11 shows a state of the spring device 30B when the length of the spring device 30B is equal to a reference length (i.e., when the spring device 30A is in the neutral state). (B) of FIG. 11 shows a state of the spring device 30B when the length of the spring device 30B is shorter than the reference length (i.e., when the spring device is further contracted with respect to the case in which the spring device 30B is in the neutral state, that is, when the spring device 30B is in the bound state). (C) of FIG. 11 shows a state of the spring device 30B when the length of the spring device 30B is longer than the reference length (i.e., when the spring device 30B is further expanded with respect to the case in which the spring device 30B is in the neutral state, that is, when the spring device 30B is in the rebound state).

Hereinafter, the spring constant of the first coil spring 31 is ks1, the spring constant of the second coil spring 32 is ks2, and the spring constant of the third coil spring 33A is ks3A.

When the suspension device 20B is in the state shown in (B) of FIG. 11, the first coil spring 31 is further compressed, the second coil spring 32 is spaced apart from the upper inner wall surface 23a in the axial direction, and the third coil spring 33A is axially compressed between the upper retainer 21 and the cylinder housing 23.

That is, when the length of the spring device 30B is shorter than the reference length (i.e., when the spring device 30B is further contracted with respect to the case in which the spring device 30B is in the neutral state), both of the first coil spring 31 and the third coil spring 33A act/function as springs, and the second coil spring 32 does not act/function as a spring. Therefore, in this case, the spring constant k2cB of the spring device 30B is equal to the sum (ks1+ks3A) of the spring constant ks1 of the first coil spring 31 and the spring constant ks3A of the third coil spring 33A.

On the other hand, when the suspension device 20B is in the state shown in (C) of FIG. 11, the distance between the upper retainer 21 and the lower retainer 22 is longer than the reference length of the spring device 30B. Thus, although the first coil spring 31 is in the compressed state, the length of the first coil spring 31 is longer than the length of the first coil spring 31 in the neutral state. In other words, the length of the first coil spring 31 further approaches the natural length of the first coil spring 31. In this case, since the annular plate 27 fixed to the piston rod 24 relatively approaches the upper portion of the cylinder housing 23, the distance between the upper portion of the cylinder housing 23 and the annular plate 27 becomes shorter. Consequently, the second coil spring 32 is compressed between the upper inner wall surface 23a and the annular plate 27.

Further, in this case, the distance between the upper retainer 21 and the outer wall surface 23b of the cylinder housing 23 becomes longer. Accordingly, the third coil spring 33A is separated from the upper outer wall surface 23b in the axial direction.

That is, when the length of the spring device 30B is longer than the reference length, each of the first coil spring 31 and the second coil spring 32 acts/functions as a spring, the spring constant k2eB of the spring device 30B is equal to the sum (ks1+ks2) of the spring constant ks1 of the first coil spring 31 and the spring constant ks2 of the second coil spring 32.

Meanwhile, the spring constant ks2 of the second coil spring 32 and the spring constant ks3A of the third coil spring 33A are set so as to satisfy the relationship that the spring constant ks2 of the second coil spring 32 is larger than the spring constant ks3A of the third coil spring 33A (ks3A<ks2). As a result, the spring constant k2cB (=ks1+ks3A) can be made smaller than the spring constant k2eB (=ks1+ks2) in the rebound state.

As described above, the spring constant of the spring device 30B is switched between the spring constant k2cB in the bound state and the spring constant k2eB (>k2cB) in the rebound state, depending on whether or not the length of the spring device 30B is longer than the reference length.

Thus, the spring device 30B is a device which satisfies the above [condition a] and [condition b], similarly to the spring device 30. Therefore, the suspension device 20B can operate similarly to the suspension device 20 to achieve effects similar to the effects of the suspension device 20.

Third Embodiment

A suspension device 200 for a vehicle according to a third embodiment of the present invention will next be described. The suspension device 200 only differs from the suspension device 20 in that the spring device 30 is an air spring.

(Configuration)

Figure 12:
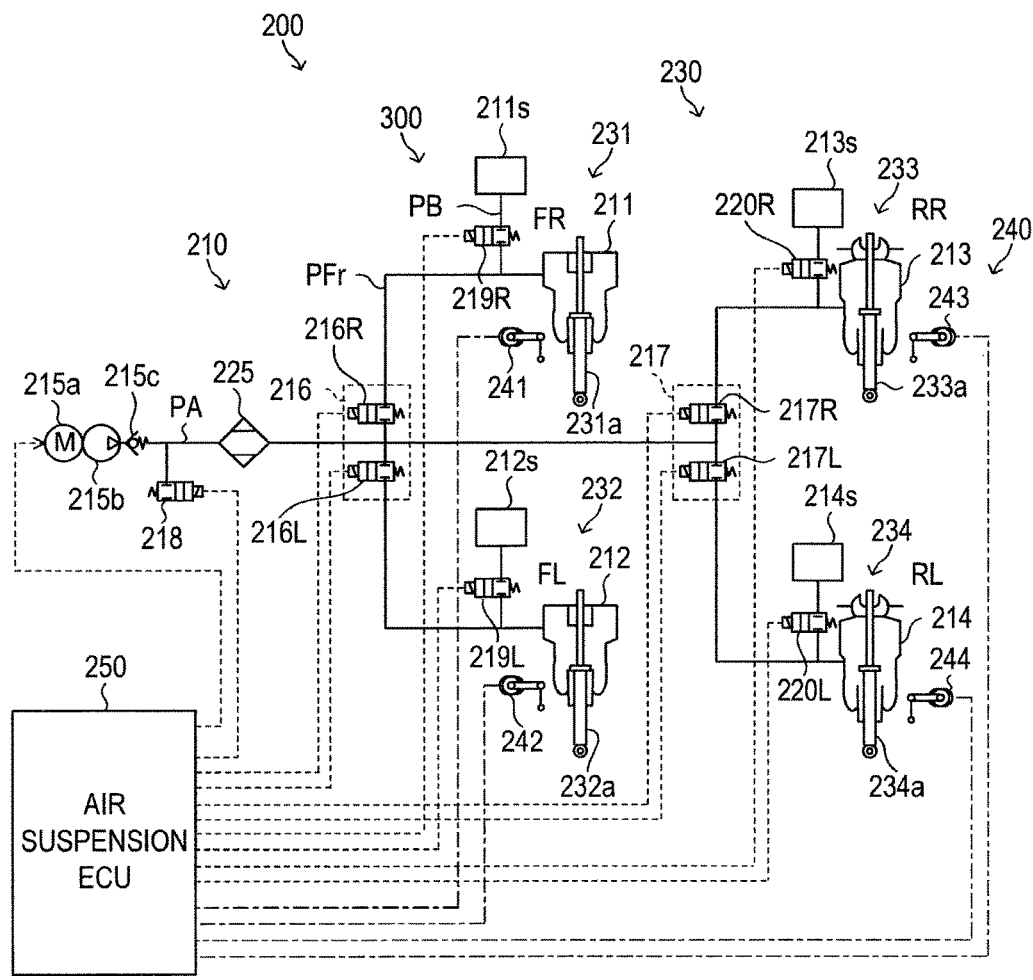
FIG. 12 is a schematic diagram for illustrating a suspension device for a vehicle according to a third embodiment of the present invention.

As shown in FIG. 12, the suspension device 200 includes an air suspension actuator 210, an air suspension 230, a vehicle height sensor 240, and an air suspension ECU 250. The suspension device 200 is a so-called "air suspension device".

The air suspension ECU 250 is electrically connected to the air suspension actuator 210. The air suspension 230 respectively suspends the front right, front left, rear right, and rear left wheels of the vehicle. The air suspension actuator 210 is connected to each air suspension 230.

More specifically, the air suspension 230 includes a front right suspension 231, a front left suspension 232, a rear right suspension 233, and a rear left suspension 234.

The front right suspension 231 includes an air spring (hereinafter also referred to as "main chamber") 211 including a diaphragm, a sub chamber 211s, and a shock absorber 231a.

The shock absorber 231a comprises a piston rod and a cylinder enclosing oil. When the piston rod expands or contracts, the shock absorber 231a generates a damping force by a resistance caused when the oil moves inside the cylinder.

Since each of the front left suspension 232, the rear right suspension 233, and the rear left suspension 234 has substantially the same structure as the front right suspension 231, the description thereof is omitted. When describing them only with reference numerals attached to the drawings, each of 212, 213 and 214 is a main chamber corresponding to 211, each of 212s, 213s and 214s is a sub chamber corresponding to 211s, and each of 232a, 233a and 234a is a shock absorber corresponding to 231a.

The air suspension actuator 210 includes a motor 215a, a compressor 215b, a check valve 215c, a front height adjustment valve 216, a rear height adjustment valve 217, an exhaust valve 218, a front chamber volume change valve 219, and a rear chamber volume change valve 220 (and air dryer 225).

The motor 215a drives the compressor 215b. The motor 215a is controlled by the air suspension ECU 250. The compressor 215b compresses the air to supply the compressed air to an air pipes PA when driven in response to an instruction from the air suspension ECU 250. The check valve 215c permits only the flow of the air from the compressor 215b to the air pipe PA, and blocks the flow of the air in the opposite direction.

The front vehicle height adjusting valve 216 includes a front right control valve 216R and a front left control valve 216L. The front right control valve 216R is a two-position solenoid valve which selects either one of the communication position and the shut-off position. When the front right control valve 216R is in the communication position, the air pipe PA, the air pipe PFr, and the main chamber 211 (and the sub chamber 211s) are communicated with each other. On the other hand, when the front right control valve 216R is in the shut-off position, the air pipe PFr and the main chamber 211 are disconnected from the air pipe PA. The front right control valve 216R is controlled by the air suspension ECU 250. Since the front left control valve 216L has the same structure and function as the front right control valve 216R, the description of the valve 216L will be omitted.

The rear vehicle height adjusting valve 217 includes a rear right control valve 217R and a rear left control valve 217L. Since the rear right control valve 217R has the same structure and function as the front right control valve 216R, the description of the valve 217R will be omitted. Since the rear left control valve 217L has the same structure and function as the rear right control valve 217R, the description of the valve 217L will be omitted.

The exhaust valve 218 is a two-position solenoid valve which selects either one of the communication position and the shut-off position. When the exhaust valve 218 is in the communication position, the air pipe PA is opened to the atmosphere. On the other hand, when the exhaust valve 218 is in the shut-off position, the air pipe PA is not opened to the atmosphere. The exhaust valve 218 is controlled by the air suspension ECU 250.

The front chamber volume change valve 219 includes a front right chamber volume change valve 219R and a front left chamber volume change valve 219L. The front right chamber volume change valve 219R is a two-position solenoid valve which selects either one of the communication position and the shut-off position. The front right chamber volume change valve 219R is interposed in a communication passage PB which communicates between the main chamber 211 and the sub chamber 211s. When the front right chamber volume change valve 219R is in the communication position, the main chamber 211 and the sub chamber 211s are communicated with each other. On the other hand, when the front right chamber volume change valve 219R is in the shut-off position, the main chamber 211 is disconnected from the sub chamber 211s. Since the front left chamber volume change valve 219L has the same structure and function as the front right chamber volume change valve 219R, the description of the valve 219L will be omitted.

The rear chamber volume change valve 220 includes a rear right chamber volume change valve 220R and a rear left chamber volume change valve 220L. Since the rear right chamber volume change valve 220R has the same structure and function as the front right chamber volume change valve 219R, the description of the valve 220R will be omitted. Since the rear left chamber volume change valve 220L has the same structure and function as the rear right chamber volume change valve 220R, the description of the valve 220L will be omitted.

The air dryer 225 maintains the humidity inside the air suspension actuator 210 at a value less than a predetermined value.

The air suspension ECU 250 is electrically connected to the vehicle height sensor 240. The vehicle height sensor 240 includes a front right vehicle height sensor 241, a front left vehicle height sensor 242, a rear right vehicle height sensor 243, and a rear left vehicle height sensor 244.

The front right vehicle height sensor 241 measures the distance X between the upper surface of the lower arm 52 to which the bottom surface of the shock absorber 231a is fixed and the lower surface of the mount portion 43 of the vehicle body 41 to which the unillustrated top plate of the air suspension 231 is fixed. The distance X is, hereinafter, referred to as "distance X between two points". The front right vehicle height sensor 241 measures the distance X between two points, for example, by utilizing reflection of the laser.

That is, the front right vehicle height sensor 241 detects the distance between the sprung member 40 and the unsprung member 50. The relationship between the distance X between two points and the above mentioned stroke amount is as follows. For example, if the distance X between two points when the stroke amount of the spring device 300 is the reference stroke amount is X0, the distance X between two points when the spring device 300 contracts by X1 from the reference stroke amount is expressed as X0–X1. Since the front left wheel height sensor 242 has the same structure and function as the front right wheel height sensor 241, the description of the sensor 242 will be omitted. Since the rear right vehicle height sensor 243 has the same structure and function as the front right vehicle height sensor 241, the description of the sensor 243 will be omitted. Since the rear left vehicle height sensor 244 has the same structure and function as the rear right vehicle height sensor 243, the description of the sensor 244 will be omitted.

When the distance X between two points detected by the vehicle height sensor 240 is less than or equal to the reference value Xth (which is equal to the distance X between two points when the stroke amount is the "threshold stroke amount"), the air suspension ECU 250 determines that the air suspension 230 is in the bound state (that is, a state in which the air suspension 230 is contracted). On the other hand, when the distance X between two points detected by the vehicle height sensor 240 is larger than the reference value Xth, the air suspension ECU 250 determines that the air suspension 230 is in the rebound state (that is, a state in which the air suspension 230 is expanded).

Each of the main chambers 211 to 214 is also referred to as a "main room". Each of the sub chambers 211s to 214s is also referred to as a "sub room". Each of combinations of the main chamber 211 and the sub chamber 211s, the main chamber 212 and the sub chamber 212s, the main chamber 213 and the sub chamber 213s, the main chamber 214 and the sub chamber 214s is also referred to as an "air spring".

Each of the front right chamber volume change valve 219R, the front left chamber volume change valve 219L, the rear right chamber volume change valve 220R and the rear left chamber volume change valve 220L is also referred to as a "switching valve". Furthermore, the air spring and the air suspension actuator 210 are also referred to as the "spring device 300".

When the distance X between two points detected by the vehicle height sensor 240 is less than or equal to the reference value Xth, it can be said that the spring device 300 is deforming such that "the volume Vm of the main chamber 211 decreases from the volume Vmc which is a volume of the main chamber 211 when the distance X between two points is equal to the reference value Xth". On the other hand, when the distance X between two points detected by the vehicle height sensor 240 is larger than the reference value Xth, it can be said that the spring device 300 is deformed such that "the volume Vm of the main chamber 211 increases from the volume Vmc".

Accordingly, the air suspension ECU 250 determines that the spring device 300 is in the bound state when the spring device 300 is deforming such that the volume Vm of the main chamber 211 decreases from the volume Vmc. On the other hand, the air suspension ECU 250 determines that the spring device 300 is in the rebound state when the spring device 300 is deforming such that the volume Vm of the main chamber 211 increases from the volume Vmc.

When the spring device 300 is deforming in a direction such that the volume Vm of the main chamber 211 decreases with respect to a predetermined threshold stroke amount, that is, when the stroke amount is larger than the threshold stroke amount, the air suspension ECU 250 sets the front right chamber volume change valve 219R (switching valve) to the communication state. As a result, the main chamber 211 and the sub chamber 211s are communicated with each other so that the volume of the entire air spring increases. In this case, the volume of the entire air spring is the sum of the volume Vm of the main chamber 211 and the volume Vs of the sub chamber 211s.

On the other hand, when the spring device 300 is deforming such that the volume Vm of the main chamber 211 increases with respect to the predetermined threshold stroke amount, that is, when the stroke amount is smaller than the threshold stroke amount, the air suspension ECU 250 sets the front right chamber volume change valve 219R (switching valve) to the shut-off state. That is, the air suspension ECU 250 disconnects the main chamber 211 from the sub chamber 211s. As a result, the volume of the entire air spring becomes equal to the volume Vm of the main chamber 211.

Meanwhile, the spring constant kas of the suspension device 200 can be obtained by the following equation as with the general air suspension device.

$$kas = n \cdot P \cdot A^2 / V \quad (7)$$

In the above equation, n represents a polytropic index, P represents an air pressure, A represents an effective pressure receiving area of the main chamber, and V represents a volume of the air chamber. A case where the suspension device 200 is in the bound state, and the main chamber 211 and the sub chamber 211s are communicated with each other (the front right chamber volume change valve 219R is in the communication position) is considered. In this case, the volume V of the air chamber is equal to the sum (Vm+Vs) of the volume Vm of the main chamber 211 and the volume Vs of the sub chamber 211s. On the other hand, the case where the suspension device 200 is in the rebound state, and the main chamber 211 and the sub chamber 211s are disconnected from each other (the front right chamber volume change valve 219R is in the shut-off position), the volume V of the air chamber is equal to the volume Vm of the main chamber 211.

Thus, assuming that the spring constant when the main chamber 211 and the sub chamber 211s are communicated with each other is kas1, and the spring constant when the main chamber 211 and the sub chamber 211s are disconnected from each other is kas2, the constant kas1 becomes smaller than the constant kas2. In this manner, the suspension device 200 can change the spring constant of the spring device 300 between when it is in the bound state and when it is in the rebound state.

(Actual Operation)

Figure 13:
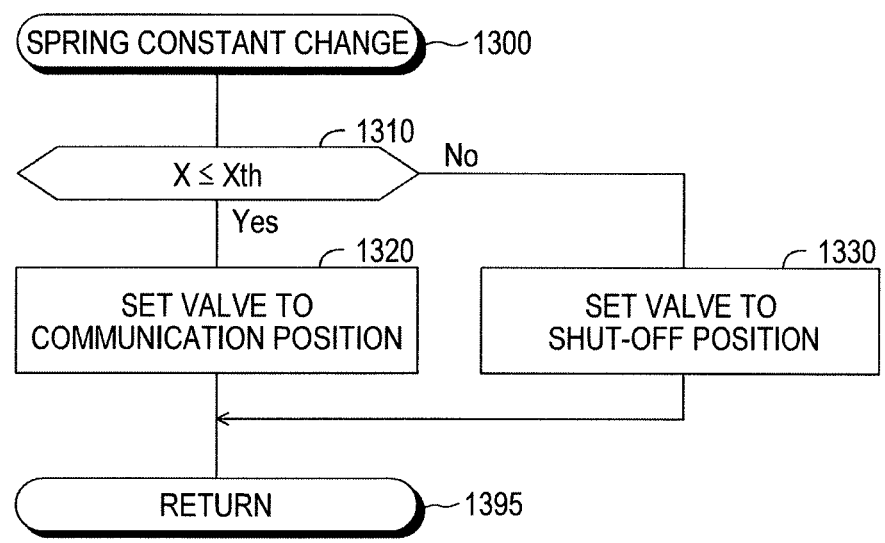
FIG. 13 is a flowchart for illustrating a "spring constant change routine" executed by a CPU of an air suspension ECU illustrated in FIG. 12.

A description is now given of an actual operation of the suspension device 200 with reference to FIG. 13. The CPU of the air suspension ECU 250 is configured to execute a spring constant changing routine illustrated as a flowchart of FIG. 13 every time a predetermined time elapses. Thus, the CPU starts processing from step 1300 at a predetermined timing, and proceeds to step 1310 to determine whether the distance X between two points is less than or equal to the reference value Xth.

When the distance X between two points is less than or equal to the reference value Xth, the CPU makes a "Yes" determination at step 1310 to proceed to step 1320, at which the CPU sets the front chamber volume change valve 219 and the rear chamber volume change valve 220 to the communication positions. Thereafter, the CPU proceeds to step 1395 to tentatively terminate the present routine.

On the other hand, when the distance X between two points is larger than the reference value Xth, the CPU makes a "No" determination at step 1310 to proceed to step 1330, at which the CPU sets the front chamber volume change valve 219 and the rear chamber volume change valve 220 to the shut-off positions. Thereafter, the CPU proceeds to step 1395 to tentatively terminate the present routine.

As described above, when the stroke amount of the spring device 300 is larger than the threshold stroke amount, the suspension device 200 sets the front chamber volume change valve 219 and the rear chamber volume change valve 220 (change over valves) to the communication state. When the stroke amount of the spring device 300 is smaller than the threshold stroke amount, the suspension device 200 sets the front chamber volume change valve 219 and the rear chamber volume change valve 220 (change over valves) to the shut-off state. As understood from the above description, the suspension device 200 can obtain operation and effect similar to those that the suspension device 20, the suspension device 20A and the suspension device 20B obtain.

Modification Example

The present invention is not limited to the above-mentioned embodiment, and various modified examples can be adopted within the scope of the present invention as described below.

In the suspension device 20, the upper end of the second coil spring 32 is not fixed and the lower side of the second coil spring 32 is fixed to the upper surface 27 of the annular plate 27. However, the second coil spring 32 may be configured in such a manner that one end of the second coil spring 32 is fixed and the other end of the second coil spring 32 is not fixed. For example, one end (the upper end) of the second coil spring 32 may be fixed to the upper inner wall surface 23a, and the other end (the lower end) of the second coil spring 32 may abut on the upper surface 27a of the annular plate 27.

In the suspension device 20, the upper end of the third coil spring 33 is fixed to the lower surface 21a of the upper retainer 21, and the lower end of the third coil spring 33 is not fixed. However, the third coil spring 33 may be configured in such a manner that one end of the third coil spring 33 is fixed and the other end of the third coil spring 33 is not fixed. For example, one end (the lower end) of the third coil spring 33 may be fixed to the upper outer wall surface 23b of the cylinder housing 23.

In the suspension device 20A, the upper end of the second coil spring 32A is not fixed and the lower end of the second coil spring 32A is fixed to the upper surface 29d of the annular portion 29b. However, the second coil spring 32A may be configured so that one end of the second coil spring 32A is fixed and the other end of the second coil spring 32A is not fixed. For example, one end (the upper end) of the second coil spring 32A may be fixed to the lower surface 23g of the flange portion 23f, and the other end (the lower end)

of the second coil spring 32A may abut on the upper surface 29d of the annular portion 29b.

In the suspension device 20B, the upper end of the third coil spring 33A is fixed to the lower surface 21a of the upper retainer 21, and the lower end of the third coil spring 33A is not fixed. However, the third coil spring 33A may be configured in such a manner that one end of the third coil spring 33A is fixed and the other end of the third coil spring 33A is not fixed. For example, one end (the lower end) of the third coil spring 33A may be fixed to the upper outer wall surface 23b of the cylinder housing 23, and the other end (the upper end) of the third coil spring 33A may abut on the lower surface 21a of the upper retainer 21.

What is claimed is:

1. A suspension device for a vehicle, which is applied to the vehicle having a seat whose seating surface displacement amount with respect to a unit change amount of a seat load which is a load input to a seating surface of the seat decreases as the seat load increases, and which includes a spring device interposed between a sprung member and an unsprung member of the vehicle and elastically supporting the sprung member with respect to the unsprung member,
wherein
in a case where a reference stroke amount is defined as a stroke amount of the spring device when an occupant sits on the seat, and the stroke amount is defined to increase in a positive direction as the spring device is displaced more greatly in a direction of contraction,
the spring device is configured to have characteristics that
a spring constant of the spring device when the stroke amount is larger than the reference stroke amount is less than or equal to a spring constant of the spring device when the stroke amount is smaller than the reference stroke amount; and
a spring constant of the spring device when the stroke amount is larger than or equal to a stroke amount which is larger than the reference stroke amount by a positive predetermined amount is smaller than a spring constant of the spring device when the stroke amount is less than or equal to a stroke amount which is smaller than the reference stroke amount by the positive predetermined amount.

2. The suspension device according to claim 1, wherein the spring device comprises:
a first spring disposed between the sprung member and the unsprung member; and
a second spring disposed between the sprung member and the unsprung member,
wherein
the first spring is arranged so as to be always compressed by the sprung member and the unsprung member, and
the second spring is arranged in such manner that the second spring is compressed by the sprung member and the unsprung member when the stroke amount is smaller than the threshold stroke amount, and the second spring is neither compressed nor expanded by the sprung member and the unsprung member when the stroke amount is larger than the threshold stroke amount.

3. The suspension device according to claim 1, wherein the spring device comprises:
an air spring including a main chamber and a sub chamber which communicates with the main chamber via a communication passage,
a switching valve which is interposed in the communication passage and is capable of switching a state of the communication passage between a communication state and a shut-off state, and
a control section which sets the switching valve to the communication state when the stroke amount is larger than the threshold stroke amount, and sets the switching valve to the shut-off state when the stroke amount is smaller than the threshold stroke amount.

* * * * *